(12) United States Patent
Hattori et al.

(10) Patent No.: US 7,445,588 B2
(45) Date of Patent: Nov. 4, 2008

(54) ELECTROCONDUCTIVE ROLLER

(75) Inventors: Takayuki Hattori, Hyogo (JP); Kenichi Uesaka, Hyogo (JP); Jun Ochi, Hyogo (JP); Jun Nishibayashi, Hyogo (JP); Shinji Bessyo, Osaka (JP); Satoshi Tanaka, Osaka (JP); Masaharu Takada, Osaka (JP); Shinji Okuda, Hyogo (JP)

(73) Assignees: Sumitomo Rubber Industries, Ltd., Kobe-shi (JP); Sunstar Giken Kabushiki Kaisha, Takatsuki-shi (JP)

( * ) Notice: Subject to any disclaimer, the term of this patent is extended or adjusted under 35 U.S.C. 154(b) by 758 days.

(21) Appl. No.: 11/073,921

(22) Filed: Mar. 8, 2005

(65) Prior Publication Data

US 2005/0202946 A1 Sep. 15, 2005

(30) Foreign Application Priority Data

Mar. 9, 2004 (JP) ............................. 2004-066426

(51) Int. Cl.
*F16C 13/00* (2006.01)
(52) U.S. Cl. .............................. 492/56; 492/59; 492/53; 428/36.5
(58) Field of Classification Search ................... 492/56, 492/59, 53; 428/36.5
See application file for complete search history.

(56) References Cited

U.S. PATENT DOCUMENTS 6,303,215 B1 * 10/2001 Sonobe et al. ........... 428/295.4
6,915,570 B1 * 7/2005 Ohgoshi et al. .......... 29/895.32
2003/0096917 A1 * 5/2003 Hattori et al. ................ 525/403
2004/0024166 A1 2/2004 Hattori et al.

FOREIGN PATENT DOCUMENTS

| EP | 0 684 613 A2 | 11/1995 |
| JP | 2577884 B2 | 11/1996 |
| JP | 2001-341139 A | 12/2001 |
| JP | 2003-105119 A | 4/2003 |

OTHER PUBLICATIONS

"Plastic Foam Handbook", Nikkan Kogyo Newspaper Ltd., Feb. 1973 (First edition).

* cited by examiner

*Primary Examiner*—David P Bryant
*Assistant Examiner*—Sarang Afzali
(74) *Attorney, Agent, or Firm*—Birch, Stewart, Kolasch & Birch, LLP

(57) ABSTRACT

An electroconductive roller including an electroconductive cellular material layer, comprised of a polyurethane composition, which has an average foamed cell diameter not more than 100 μm and a variation ΔD of the foamed cell diameter not more than 50 μm. The electroconductive roller has a hardness variation ΔHs not more than 8 degrees and a circumferential non-uniformity index $R_{MAX}/R_{MIN}$ in an electric resistance thereof not more than 1.3. The electroconductive cellular material layer is made of a thermosetting one-part polyurethane composition. And the polyurethane composition is cured instantly at a temperature not less than a thermosetting critical temperature for curing thereof, after it is foamed by a mechanical foaming method.

12 Claims, 4 Drawing Sheets

ELECTROCONDUCTIVE ROLLER

This nonprovisional application claims priority under 35 U.S.C. § 119(a) on Patent Application No(s). 2004-066426 filed in Japan on Mar. 9, 2004, the entire contents of which are hereby incorporated by reference.

BACKGROUND OF THE INVENTION

1. Field of the Invention

The present invention relates to an electroconductive roller having an electroconductive cellular material layer comprised of a polyurethane composition. Particularly, the present invention relates to an electroconductive roller having a small diameter in foamed cells thereof, a small variation width in the diameter in the foamed cells thereof, a small variation width in the hardness thereof, and a small variation width in the electric resistance thereof. More particularly, the present invention relates to a roller whose electroconductive cellular material layer is composed of a thermosetting one-part polyurethane composition with which a gas is mechanically mixed, a method of manufacturing the electroconductive roller, and an image-processing apparatus having the electroconductive roller.

2. Description of the Related Art

In recent years, as electrophotographic technique progresses and an image-processing apparatus using the electrophotographic technique is provided with technique of forming images in color at a high speed, a semi-electroconductive member utilized in an electrophotographic process is demanded to have a high-level technique. An elastic roller utilized for transfer, development, toner supply, and electric charging is demanded to be semi-electroconductive and have a uniform electric resistance to obtain a high-quality image. The elastic roller is also demanded to have a smaller volume and a high process efficiency. In addition, the elastic roller is demanded to be soft and have a uniform hardness to prevent other members such as an electrophotographic photoreceptor of the image-processing apparatus from being damaged. A soft elastic roller allows a large nip width to be formed between it and the electrophotographic photoreceptor and the like when the soft elastic roller is pressed against the electrophotographic photoreceptor. Thus a higher process efficiency can be obtained. Further the soft elastic roller hardly damages members of the electrophotographic photoreceptor, when the soft elastic roller is pressed against the electrophotographic photoreceptor and the like. Moreover the elastic roller is demanded to have a uniform hardness to obtain a uniform high-quality image.

In a conventional method, to make the elastic roller have a low hardness and a large nip width, process oil and a softening agent such as ester plasticizer are added to a rubber composition or a polyurethane composition.

But this conventional method of making the elastic roller have a low hardness has a problem that the softening agent causes bleeding and migration contamination to occur. Thereby the electrophotographic photoreceptor and the like are deteriorated, which causes generation of defective images.

To solve this problem, a method of using an electroconductive blowing agent is adopted to make the elastic roller have a low hardness. In this method, a chemical blowing agent such as azodicarbonamide (ADCA) or 4,4-oxybis (benzene sulfonyl hydrazide) (OBSH) is added to a rubber composition. Owing to heat applied thereto during vulcanization, a gas is generated from the chemical blowing agent. Various improvements have been made for the kind of a blowing agent and an assistant blowing agent, a vulcanizing condition, a vulcanizing agent, and a vulcanizing accelerator.

For example, in Japanese Patent Application Laid-Open No. 2003-105119 (patent document 1), the present applicant proposed a rubber roller having an electroconductive layer containing epichlorohydrin rubber and a chemical blowing agent of OBSH. The rubber roller having the electroconductive layer has a considerably large variation width of uniformity in foamed cell diameters in the range of 10 μm to 100 μm.

The rubber roller having the electroconductive layer described in the patent document 1 is uniform in the electric resistance and has a superior performance in the present technique level. But epichlorohydrin rubber containing chlorine is used for the rubber roller. Hence when the rubber roller is destroyed by fire, there is a possibility that hydrogen chloride gas is generated and that dioxine is generated in dependence on a burning condition. Thus it is difficult to destroy the rubber roller, and hence the disposal cost is high.

Such being the case, to reduce the cost required for the disposal and prevent environmental contamination, in recent years, there is a tendency for polyurethane to be used instead of the epichlorohydrin rubber for the electroconductive cellular material layer of the elastic roller. The use of the polyurethane allows production of the elastic roller not containing chlorine or bromine and the molecular structure of the composition of the electroconductive cellular material layer to be designed considerably freely by arbitrarily altering the structure of polyol and isocyanate compound and the mixing ratio thereof. Hence the use of the polyurethane makes it easy to adapt with various users' demands.

As shown in the non-patent document 1, several methods are used to foam a polyurethane composition. For example, in the method (by physical blowing agent) of obtaining a foam disclosed in Patent Publication No. 2577884 (patent document 2), a flon-containing solvent is used as the blowing agent, and the blowing agent is vaporized by reaction heat generated when the polyurethane is formed by reaction between polyisocyanate and polyol. But this method has a problem that progress speed of the reaction is different in dependence on portions of a mold in a polyurethane reaction. Consequently there is a variation in foamed states in dependence on portions of the mold.

A foaming method that is carried out by using water is disclosed in Japanese Patent Application Laid-Open No. 2001-341139 (patent document 3). A prepolymer process is used in this method. Thus this method allows a curing reaction to progress, but there is a variation in the speed of the reaction between water and a prepolymer in dependence on portions of a mold. Consequently there is a variation in the foamed state.

The polyurethane foam proposed in Patent Publication No. 3278316 (patent document 4) is formed by foaming polyol which has reacted with polyisocyanate by using a mechanical froth method (method of mixing foamable cells into polyol). In the method disclosed in the patent document 4, foamable cells are generated by mixing air into the polyurethane composition with a mixer to obtain a foam. In this method, it is difficult to mix foamable cells uniformly into the polyurethane composition. Thus as in the case of the above-described two methods, there is a large variation in the foamed state and the foamed cell diameter. Hence the method disclosed in the patent document 4 is incapable of producing products that withstand practical use.

To use the elastic roller for the image-processing apparatus, it is necessary to impart electroconductivity to the cellular material layer of the elastic roller to provide the elastic roller with semi-electroconductivity and reduce a variation in the electric resistance thereof to obtain preferable images.

To impart electroconductivity to the cellular material layer, the following three methods are known: In one method, an electroconductive filler such as powder of metal oxides and carbon black is added to a rubber composition or the like to make the cellular material layer electroconductive. In another method, ionic-electroconductive rubber/elastomer or an ionic-electroconductive agent is added to the rubber composition or the like. In still another method, both the electroconductive filler and the ionic-electroconductive rubber/elastomer or the ionic-electroconductive agent are added to the rubber composition or the like.

When the cellular material layer is made electroconductive, the electric resistance of a semielectroconductive region changes suddenly owing to a slight change of an addition amount of the electroconductive filler, although the electric resistance of the semielectroconductive region is demanded to have a constant electric resistance. Thus it is very difficult to control the electric resistance. Another problem of this method is that it is very difficult to disperse the electroconductive filler uniformly in the composition. Therefore the electric resistance of the elastic roller is liable to have variations in its circumferential and longitudinal directions. In addition, there is variations in the electric resistance of products. In particular, when the elastic roller is formed by molding materials in a small mold having a size almost equal to that of the electroconductive roller, the electroconductive filler is distributed non-uniformly. Still another problem of this method is that the electric resistance of the electroconductive roller depends greatly on an applied voltage and hence is not constant. When carbon black is used as the electroconductive filler, this tendency is outstanding. Such a phenomenon makes a mechanical control difficult in image-processing processes such as electric charging, development, transfer, and fixing. Thus the cost of the electroconductive roller is high. When the carbon black is used as the electroconductive filler, the electroconductive roller is colored in black and hence cannot be colored in a desired color. Thus it is difficult to find that the electroconductive roller has been contaminated with toner.

It is preferable to make the cellular material layer ionic-electroconductive because the cellular material layer made electroconductive has the above-described problems. The electric resistance of an ionic-electroconductive roller practically used depends greatly on environment. Thereby it is necessary to provide an image-processing apparatus with a large power source and in addition, a complicated control mechanism. Consequently there is a possibility that the cost for manufacturing the ionic-electroconductive roller and the running cost become high. Because the electric resistance of the ionic-electroconductive roller depends greatly on environment, it is necessary to conduct many environmental tests in development. Consequently the development cost increases. There is a possibility that the ionic-electroconductive roller contaminates the electrophotographic photoreceptor in dependence on a component used therefor. In consideration of the above-described problems, improvement is required for the ionic-electroconductive roller.

Patent document 1: Japanese Patent Application Laid-Open No. 2003-105119

Patent document 2: Patent Publication No. 2577884

Patent document 3: Japanese Patent Application Laid-Open No. 2001-341139

Patent document 4: Patent Publication No. 3278316

Non-patent document 1: Page 67 to 218 of "Plastic foam handbook" published by Nikkan Kogyo Shinbun Inc. on February 28, in the 48th year of Showa.

SUMMARY OF THE INVENTION

The present invention has been made in view of the above-described problems. Therefore it is an object of the present invention to provide an electroconductive roller having an electroconductive cellular material layer (hereinafter frequently referred to as merely "electroconductive roller" or "roller" by omitting "electroconductive cellular material layer") in which the foamed cell diameter is small, the variation range of the foamed cell diameter is small, and there is a small variation range in the hardness and the electric resistance, which does not contaminate an electrophotographic photoreceptor, and which does not generate an environmental problem when it is destroyed; a method of manufacturing the electroconductive roller having the electroconductive cellular material layer; and an image-processing apparatus using the electroconductive roller having the electroconductive cellular material layer.

To solve the above-described problems, there is provided an electroconductive roller including an electroconductive cellular material layer, comprised of a polyurethane composition, which has an average foamed cell diameter not more than 100 μm and a variation ΔD of the foamed cell diameter not more than 50 μm. The electroconductive roller has a hardness variation ΔHs not more than 8 degrees and an index value $R_{MAX}/R_{MIN}$ of a circumferential non-uniformity in an electric resistance R thereof not more than 1.3.

As the image quality becomes higher and toner becomes finer, it is desired that the diameter of foamed cells is made smaller. Unless the foamed cells become finer as the toner becomes finer, the electroconductive roller is contaminated with the toner and in addition it is difficult to obtain a resolution smaller than the foamed cells. The present inventors have found that when the average value of the diameter of the foamed cell is not more than 100 μm and when the variation ΔD of the foamed cell diameter is not more than 50 μm, it is possible to prevent the electroconductive roller from being contaminated with the toner and obtain a clear image having a high resolution.

The average value of the diameters of the foamed cells is favorably not more than 80 μm and more favorably not more than 60 μm. It is preferable that the average value of the diameters of the foamed cells is set as small as possible. But from the standpoint of production, the average value of the diameters of the foamed cells is not less than 20 μm.

In the present invention, the electroconductive cellular material layer is comprised of a thermosetting one-part polyurethane composition foamed by a mechanical foaming method. Thereby the present invention provides the electroconductive roller uniform in its cell diameter, hardness, and electric resistance. In the present invention, after a gas is mechanically mixed with the thermosetting one-part polyurethane composition at a low pressure, the thermosetting one-part polyurethane composition is injected from a nozzle into a mold. Thereby the thermosetting one-part polyurethane composition foams as soon as it is injected into the mold from the nozzle. The thermosetting one-part polyurethane composition cure, as soon as it is heated at a temperature higher than the thermosetting critical temperature for curing thereof. Therefore the foamed cells are very fine and uniform in their configurations and diameters. Therefore the electroconductive roller is uniform in its hardness, properties, and electric resistance.

Using the above-described method, the present invention provides the electroconductive roller having foamed cells uniform and fine in the diameter thereof. Thus the electroconductive roller has uniform properties which cannot be achieved by the conventional art.

The variation ΔD of the foamed cell diameter means the difference between a maximum foamed cell diameter and a minimum foamed cell diameter. The variation ΔD of the foamed cell diameter is favorably not more than 40 μm, more favorably not more than 30 μm, and most favorably not more than 15 μm. It is favorable that the variation ΔD of the foamed cell diameter is established as small as possible. But from the standpoint of production, the variation ΔD of the foamed cell diameter is actually not less than 5 μm. The average value of the foamed cell diameter and the variation ΔD of the foamed cell diameter are measured by using a method which will be described later in the description of the examples of the present invention.

The present inventors have found that when the hardness variation ΔHs is set to not more than 8 degrees, a uniform and preferable image can be obtained. A load of 500 g is applied to left and right portions of the shaft of the roller to measure the hardness of the roller at three points (both ends of the roller and the center point) by using a type-E Durometer specified in JIS K6253. The roller is rotated 4 times by 90 degrees in the circumferential direction thereof. Therefore the hardness of the roller is measured at 3×4=12 points. The hardness variation ΔHs means the difference between a maximum of measured values and a minimum thereof. The hardness variation ΔHs is favorably not more than 5 degrees, more favorably not more than 3 degrees, and most favorably not more than 2 degrees. The smaller the hardness variation ΔHs, the more favorable.

The present inventors have also found that when the index value $R_{MAX}/R_{MIN}$ of the circumferential non-uniformity of the electric resistance of the electroconductive roller is not more than 1.3, the hardness variation ΔHs is small and a uniform and preferable image can be obtained.

The circumferential non-uniformity of the electric resistance of the electroconductive roller is indicated by the ratio of a maximum value ($R_{MAX}$) of the circumferential electric resistance thereof to a minimum value ($R_{MIN}$) of the circumferential electric resistance thereof. The maximum value ($R_{MAX}$) of the circumferential electric resistance and the minimum value ($R_{MIN}$) thereof are measured by a method used in the examples of the present invention which will be described later.

The index value of the circumferential non-uniformity of the electric resistance is favorably not more than 1.2, and more favorably not more than 1.15, and most favorably not more than 1.1. The circumferential non-uniformity of the electric resistance does not become less than 1. Thus the circumferential non-uniformity of the electric resistance is always not less than 1. In the present invention, as described above, after the gas is mechanically mixed with the thermosetting one-part polyurethane composition at a low pressure, the thermosetting one-part polyurethane composition is injected from the nozzle into the mold. Thereby the thermosetting one-part polyurethane composition foams as soon as it is injected into the mold from the nozzle. As soon as the thermosetting one-part polyurethane composition is heated higher than the thermosetting critical temperature for curing thereof, it cure quickly. Therefore in the obtained foam, foamed cells are very fine and uniform in their configurations and diameters. The electroconductive cellular material layer obtains ionic-electroconductivity to some extent from polyether polyol which is a material for a polyurethane prepolymer. The electroconductive cellular material layer also obtains necessary and uniform semi-electroconductivity in the range of $10^4 \Omega$ to $10^{12} \Omega$ from salts of strong basic tertiary amines added to the polyurethane composition as a catalyst and/or an ionic-electroconductive agent, also added to the polyurethane composition, which comprises of any one of anionic salts shown by the chemical formulas 1 through 3. Accordingly the electroconductive roller of the present invention has a small circumferential nonuniformity and has little variations in its electric resistance.

Because the polyurethane composition is used as the material of the electroconductive cellular material layer, it is unnecessary to add a chlorine-containing material such as epichlorohydrin rubber thereto. Thus it is possible to eliminate a particular treatment in disposing of the electroconductive roller. Therefore the electroconductive roller of the present invention can be manufactured at a low cost without contaminating environment.

The thermosetting one-part polyurethane composition that is comprised of a filler, a polyurethane prepolymer which is a reaction product of trifunctional polyether polyol, and diamine having two amino groups used as a curing agent, although the materials comprised to the thermosetting one-part polyurethane composition are not limited to specific one. Thereby it is possible to perform crosslinking at a low density, and the electroconductive roller contaminates the electrophotographic photoreceptor at a very low degree. Further it is possible to achieve Tg (glass transition temperature) of the electroconductive roller not more than −30° C. Therefore it is possible to reduce the degree of the dependence of the properties of rubber of the roller such as modulus of elasticity thereof on temperature and humidity in a generally living environment.

For the above-described reason, it is possible to establish a relationship of $\log_{10} R_{LL} - \log_{10} R_{HH} \leq 1.4$ between an electric resistance $R_{LL}(\Omega)$ of the electroconductive roller at a low temperature and a low humidity (10° C., relative humidity: 15%) and an electric resistance $R_{HH}(\Omega)$ thereof at a high temperature and a high humidity (32.5° C., relative humidity: 90%).

When the electroconductive roller having an electric resistance satisfying the above-described requirement is used as a transfer roller of an image-processing apparatus, it is easy to control a transfer voltage and simplify the mechanism of the image-processing apparatus. Since the electric resistance of the electroconductive roller depends on environment (temperature and humidity) at a low degree, there is a possibility that the capacity of the power source of the image-processing apparatus can be reduced. Thereby it is possible to make the image-processing apparatus small and save energy. The value of $\log_{10} R_{LL} - \log_{10} R_{HH}$ is more favorably not more than 1.3 and most favorably not more than 1.2. It is favorable that the value of $\log_{10} R_{LL} - \log_{10} R_{HH}$ is establised as small as possible. When the cellular material layer is made electroconductive not by an electroconductive filler but by an ionic-electroconductive agent, the value of $\log_{10} R_{LL} - \log_{10} R_{HH}$ is not less than 0.5 in the present the technique.

As described above, the electroconductive roller of the present invention is comprised of the thermosetting one-part polyurethane composition to which the filler having a low dielectric constant as necessary, the polyurethane prepolymer which is a reaction product of the trifunctional polyether polyol, and the diamine as the curing agent are added. Thereby the electroconductive roller can be designed to have a molecular structure having a small crosslinking density and little contaminate the electrophotographic photoreceptor. In addition, a foam stabilizer, the ionic-electroconductive agent, and if necessary, the tertiary amine compound are added to the thermosetting one-part polyurethane composition. Thereby it is possible to achieve the electrostatic capacity of the electroconductive roller to not more than 50 pF when it is measured at 100 Hz. There is a tendency for the frequency characteristic of the electrostatic capacity of a material to be exhibited at 100 Hz. The electrostatic capacity at 100 Hz shows a correlation with an evaluation of toner dispersion when the electroconductive roller is used as a transfer roller or the like, as described below. The electrostatic capacity herein means the electrostatic capacity of the entire electroconductive roller including its metal shaft.

The toner dispersion is a phenomenon which occurs because of a difference in polarization speeds of media (electroconductive filler such as carbon black, dielectric, and polar molecule) of an electric charge contained in the materials of the electroconductive elastic layer. When the polarization speed is a late, the change of an electric charge on the surface of the electroconductive roller is in capable of following the change of an electric field in the process of forming the electroconductive elastic layer. For example, when a transfer roller having such an electroconductive layer, the toner dispersion is liable to occur.

The present inventors have considered that it is difficult for the phenomenon of the toner dispersion to occur when the electrostatic capacity which indicates the polarization speed is a late. As a result of their researches, they have found that the toner dispersion can be suppressed by reducing the electrostatic capacity and the degree of dependence of the electrostatic capacity on the frequency. As a result of their investigations on numerical values, they have found that the electric resistance ($\Omega$) at an applied voltage of 1000V is preferably not more than $10^{12}\Omega$ and that the electrostatic capacity at 100 Hz is preferably not more than 50 pF. When the electrostatic capacity at 100 Hz is more than 50 pF, the polarization speed is a late, and it is not easy to generate the effect of suppressing the toner dispersion. The electrostatic capacity is favorably not more than 40 pF, more favorably not more than 35 pF, and most favorably not more than 30 pF. It is very favorable to achieve the electrostatic capacity to a value limitlessly close to zero. But the electrostatic capacity is actually not less than 10 pF. As described above, there is a tendency for frequency characteristic of the electrostatic capacity of a material to be exhibited at 100 Hz. Further the electrostatic capacity becomes larger at 100 Hz than at a high frequency. Particularly, in a material whose electrostatic capacity depends greatly on a frequency, the electrostatic capacity is liable to become large even at a low frequency of 100 Hz. Thus at 100 Hz, the correlation between the electrostatic capacity and the toner dispersion can be understood easily.

The reason the electric resistance ($\Omega$) is established to not more than $10^{12}\Omega$ at an applied voltage of 1000V is as follows: When the electric resistance is high, the electrostatic capacity at 100 Hz can be easily made small. When the electric resistance is higher than $10^{12}\Omega$, it is difficult to obtain a sufficient current value, even though a considerably high voltage is applied. Thus when the electroconductive roller having an electric resistance higher than $10^{12}\Omega$ is used as a roller for transfer, development, toner supply or electric charging, the electroconductive roller causes the process efficiency to deteriorate and hence cannot be used practically. For this reason, at an applied voltage of 1000V, the electric resistance ($\Omega$) of the electroconductive roller is set to favorably not more than $10^{12}\Omega$, more favorably not more than $10^{9.0}\Omega$, and most favorably not more than $10^{8.5}\Omega$. On the other hand, when the electric resistance is too small, too much electric current flows. As a result, defective images are liable to be formed to a high extent. For this reason, the electric resistance of the electroconductive roller is favorably not less than $10^{4.0}\Omega$ and more favorably not less than $10^{5.0}\Omega$.

It is preferable that when a component is extracted from the electroconductive cellular material layer for 6 hours by using a Soxhlet apparatus and acetone as a solvent, the ratio of the weight of the component to the weight of resin measured before the extraction is not less than 20%. Thereby it is possible to prevent the electroconductive roller of the present invention from contaminating other members of the image-processing apparatus. The ratio of the weight of the component to the weight of the resin is favorably not more than 15%, more favorably not more than 10%, and most favorably not more than 7%. Above all, when the electroconductive roller of the present invention is used as a roller which has a possibility of contacting an electrophotographic photoreceptor or particularly used as a roller which has a possibility of contacting an electrophotographic photoreceptor having a very high sensitivity to obtain a high performance, the ratio of the weight of the component to the weight of the resin is most favorably not more than 7% to prevent the electrophotographic photoreceptor from being contaminated and obtain a clear image. It is preferable that the ratio of the component to the weight of the resin is set to limitlessly close to zero to prevent the electrophotographic photoreceptor from being contaminated. But if the crosslinking density is achieved very high to reduce the ratio of the weight of the component to the weight of the resin, the fatigue characteristic and flexing resistance of the cellular material layer of the electroconductive roller and the durability thereof deteriorates. Consequently when the electroconductive roller is used successively, there is a possibility that images deteriorate. In view of these standpoints, the ratio of the weight of the component to the weight of the resin is not less than 5% when the electroconductive roller is demanded to have a high durability and not less than 2% when the electroconductive roller is not demanded to have a high durability.

It is preferable that the electroconductive cellular material layer of the electroconductive roller of the present invention is comprised of the polyurethane composition and more favorably of the thermosetting one-part polyurethane composition and has a low electric resistance and a low glass transition temperature (Tg). Thereby it is possible to reduce the degree of the dependence of the visco-elasticity on temperature in the neighborhood of a room temperature and a normal humidity and the degree of the dependence of the electric resistance of the electroconductive roller on environment. The glass transition temperature of the polyurethane forming the electroconductive layer of the electroconductive roller is favorably not more than $-30°$ C., more favorably not more than $-40°$ C., and most favorably not more than $-50°$ C.

It is preferable that the following components are added to the polyurethane composition or the thermosetting one-part polyurethane composition which is used in the present invention: a polyurethane prepolymer, a latent curing agent, a foam stabilizer, and an additive such as a filler which is used if necessary. More specifically, in addition to the polyurethane prepolymer, the latent curing agent formed by inactivating polyamine, the foam stabilizer, and the filler, the following components may be comprised to the thermosetting one-part polyurethane composition: a polyisocyanate compound, a catalyst consisting of a salts of strong basic tertiary amine, a plasticizer, a solvent, and a coloring agent. The catalyst can be used to completely progress a reaction between the latent curing agent and isocyanate groups. In addition, the catalyst can be used singly as an alternative of the ionic-electroconductive agent or in combination with the ionic-electroconductive agent to reduce the electric resistance value of the electroconductive layer by imparting an ionic electroconductivity thereto.

As the catalyst, metal salts of organic acids may be used. In addition, it is possible to use salts of 1,8-diazabicyclo (5,4,0) undecene-7 (abbreviated as DBU) and various acids, formic acid, acetic acid, octylic acid, maleic acid, phenol, salts of strong basic of tertiary amine compounds such as p-toluenesulfonic acid. Except the above-described metal salts of organic acids, the above-described catalysts having a big difference between the activity at a low temperature and the activity at a high temperature are particularly preferably used to manufacture the electroconductive cellular material layer of the electroconductive roller by the method including the steps of foaming a thermosetting one-part polyurethane composition containing a gas and a thermosetting one-part polyurethane composition to which a polyurethane prepolymer and a latent curing agent formed by inactivating a solid polyamine are added; molding the foamable thermosetting one-part polyurethane composition at a temperature less than a thermosetting critical temperature for curing thereof, with the foamable thermosetting one-part polyurethane composition kept in a foamed state; and heating the foamable thermosetting one-part polyurethane composition to a temperature not less than the thermosetting critical temperature thereof to curing the thermosetting one-part polyurethane composition. It is preferable to add 0.001 to 1 part by weight of these catalysts to 100 parts by weight of the polyurethane prepolymer.

The polyurethane prepolymer is formed by a polyaddition reaction between a polyol component and a polyisocyanate compound.

As the polyisocyanate which is used as the material for the polyurethane prepolymer, it is possible to use aromatic polyisocyanate compounds such as tolylene diisocyanate (TDI), diphenylmethane diisocyanate (MDI), polymeric MDI, and alicyclic polyisocyanate compounds such as isophorone diisocyanate, hexamethylene diisocyanate. These compounds can be used singly or in combination. Of the above-described compounds, the diphenylmethane diisocyanate (MDI), modified substances thereof, the polymeric MDI, and the alicyclic polyisocyanate compounds can be preferably used.

As the polyol components which are used as the material for the polyurethane prepolymer, polyether polyols such as polypropylene glycol (PPG), polytetramethylene glycol (PTMG), and polyethylene glycol (PEG) are preferable. The polyurethane prepolymer formed by using the above-described polyols as the main component thereof has a low degree of dependence on temperature and environment and moreover a low electric resistance. Among the above-described polyols, the PPG polyol having an ethylene oxide unit at its end is particularly preferable. The ethylene oxide unit of the PPG polyol reduces the electric resistance of the electroconductive layer of the electroconductive roller and further improves the reactivity of OH group at the end thereof. Thereby the OH group can react quantitatively with the isocyanate group. In addition, the PPG polyol reduces the glass transition temperature (Tg). The content of the ethylene oxide unit is not less than 5 mol % nor more than 90 mol %, favorably not less than 8 mol % nor more than 80 mol %, and more not less than 10 mol % nor more than 75 mol %.

Silicone modified polyol or butadiene polyol is capable of reducing the degree of the dependence of the electroconductive layer on temperature and humidity, and is capable of reducing the surface tension thereof, the silicone modified polyol or the butadiene polyol can be used as the foam stabilizer as well.

It is preferable that the addition amount of the silicone modified polyol is 0.1 to 20 parts by weight for 100 parts by weight of the polyol. If the addition amount of the silicone modified polyol is less than 0.1, the silicone modified polyol is incapable of providing the effect of making the foamed cell of fine and homogeneous and hence does not function properly as the foam stabilizer. If the addition amount of the silicone modified polyol is more than 20 parts by weight, the electroconductive cellular material layer is incapable of obtaining a necessary degree of electroconductivity, and the silicone component contaminates the electrophotographic photoreceptor.

Polyester polyol has a high effect of dissolving anionic salts which are shown by the chemical formulas 1 through 3 and thus stabilizing ions and reducing the electric resistance of the electroconductive cellular material layer appropriately. Thus in addition to the polyol, the polyester polyol can be used as a material for the polyurethane prepolymer.

In the present invention, it is possible to use the silicone modified polyol which can be used as a material for the polyurethane prepolymer as the foam stabilizer. When the silicon modified polyol is acted as the foam stabilizer, it is possible to outstandingly improve the foamed state and the stability of foamed cells and obtain foamed cells which are fine and uniform in the diameter thereof. The silicon modified polyol can be fixed into the molecular chain of the polyurethane prepolymer by crosslinking. Thus unlike the case in which conventional low-molecular-weight foam stabilizer is used, there is little possibility that migration contamination or bleeding occur. Consequently the electroconductive roller of the present invention having foamed cells fine and uniform in the diameter thereof. Further the electroconductive roller hardly makes migration contamination on the electrophotographic photoreceptor, hardly gives rise to bleeding, and has high performance and can be practically used.

As the foam stabilizer, it is possible to use silicone surface active agents such as polyether modified silicone oligomer containing ethylene oxide, propylene oxide, and the like; fluorine surface active agents such as perfluoroalkyl sulfonate, perfluoro octoate ammonium, and potassium salt of perfluoroalkyl-N-ethylsulfonylglycine; and hydrocarbon surface active agents such as polyoxyethylene alkylether in addition to the silicon modified polyol.

In addition to the above-described single component, as a reactive foam stabilizer, it is possible to use compounds containing functional groups, namely, alcoholic hydroxyl groups, primary or secondary amino groups, and mercapto groups containing hydrophobic polyorganosiloxane groups, perfluoroalkyl groups or long-chain alkyl groups and reactive with the isocyanate group. As the reactive foam stabilizer, it is possible to use fluorine modified polyether polyol, alcohol-terminated silicone oligomer, and amine-terminated silicone oligomer. In consideration of the stability of the final composition, it is desirable to make a reaction between the polyisocyanate and these reactive foam stabilizers before the reactive foam stabilizers are added to the thermosetting one-part polyurethane composition or make a reaction between the polyisocyanate and these reactive foam stabilizers when the polyurethane prepolymer is synthetically prepared.

As the foam stabilizer, it is possible to use the above-described unreactive compounds singly or in combination and reactive compounds which will be described later singly or in combination.

It is desirable that a filler is added to the thermosetting one-part polyurethane composition. Inorganic or organic fillers can be added to the thermosetting one-part polyurethane composition. As the inorganic filler, it is possible to use titanium oxide, calcium carbonate, clay, silica, zirconia, alumina, and talc singly or in combination. As the organic filler, it is possible to use organic polymer particles of carbon black, polyacrylic resin, polystyrene, polypropylene and polyethylene singly or in combination. The filler can be used as a reinforcing filler for retaining the strength of the thermosetting one-part polyurethane composition when it cured by heat. On the other hand, it is unpreferable that the electroconductive roller has a very high hardness. It is preferable that 0.5 wt % to 30 wt % of the filler is added to the entire polyurethane composition. As the filler, it is particularly preferable to use fine particles, having a diameter of 0.1 μm to 50 μm, which comprised of a homopolymer of a monomer having methyl methacrylate, styrene, acrylonitrile, and vinyl double bond groups or a copolymer of the monomer. Since the above-described latent curing agent is bifunctional, the crosslinking density is liable to become low. Thus the filler is necessary for improving the strength of the foam. The use of the organic polymer particle makes it easy to improve the strength of the electroconductive roller without making the electroconductive roller too hard. Thus the organic polymer particles is suitable for the electroconductive roller having the electroconductive cellular material layer of the present invention. The organic polymer particle is added to the polyurethane composition at 0.5 wt % to 30 wt % and preferably 2 wt % to 20 wt %. If the addition amount of the organic polymer particle is less than 0.5 wt %, the organic polymer particle is incapable of achievement the reinforcing effect. On the other hand, if the addition thereof is more than 30 wt %, the hardness of the polyurethane composition becomes too high, the foam becomes brittle or the viscosity of the polyurethane composition rises outstandingly before the polyurethane composition is cured. Thus it is unpreferable that the polyurethane composition contains more than 30 wt % of the organic polymer particle.

The filler comprising of organic polymer particles is used by adding it to the thermosetting one-part polyurethane composition by making the organic polymer particles fine or after prepared a dispersion (polymer polyol) by polymerizing a monomer in polyol before the polyurethane prepolymer is prepared synthetically.

In imparting electroconductivity to the cellular material layer of the electroconductive roller of the present invention, the following three methods can be used: In a first method, an electroconductive filler such as carbon black is added to the polyurethane composition to make the cellular material layer electroconductive; In a second method, ionic-electroconductive rubber or an ionic-electroconductive agent is added to the polyurethane composition to make the cellular material layer ionic-electroconductive; and in a third method, the first method and the second method are used in combination. The above-described problem occurs in the first method. Thus in the present invention, it is preferable to adopt the second method or the third method. Supposing that when the third method is adopted and the electric resistance of the electroconductive roller at a normal temperature and a normal pressure (23° C., relative humidity) is set to R(Ω) and that when only the ionic-electroconductive agent is used and the electric resistance of the electroconductive roller at a normal temperature and a normal pressure (23° C., relative humidity) is set to Rion(Ω), it is favorable that the relationship of R≦Rion≦100R is established between R(Ω) and Rion(Ω) and more favorable that that the relationship of R≦Rion≦10R is established therebetween. If the ionic-electroconductivity and other electroconductive performances are not completely damaged and the above-described foaming property can be retained, the electroconductive filler may be added to the polyurethane composition as necessary.

To make the cellular material layer ionic-electroconductive, a method of using an ionic-electroconductive polymer or a method of adding an ionic-electroconductive agent to the polyurethane composition can be used. As the ionic-electroconductive polymer, it is possible to use a polymer composition having a polar group such as a polyether structure, cyan groups, and a polyester structure therein. More specifically, it is possible to use thermosetting two-part polyurethane, thermosetting one-part polyurethane, mirabelle type polyurethane, acrylonitrile butadiene rubber, and epihalohydrin rubber (particularly, epichlorohydrin rubber).

In the present invention, to provide the electroconductive roller having foamed cells fine and uniform in the diameter thereof and uniform performance and comprised of a material not containing chlorine, the electroconductive roller is made of the polyurethane composition and ionic-electroconductive agents (which will be described in detail below) used as necessary to control the electroconductivity thereof.

It is preferable to add anionic salts shown by any one of chemical formulas 1, 2, and 3 shown below to the polyurethane composition and particularly to the thermosetting one-part polyurethane composition as an ionic-electroconductive agent:

Chemical formula 1

Chemical formula 2

Chemical formula 3 where $X_1$, $X_2$, and $X_3$ are identical to or different from each other and show functional groups, having 1 to 8 carbon atoms, which contain carbon atoms, fluorine atoms, and sulfonyl group ($-SO_2-$).

The anionic salts shown in the above-described chemical formulas 1 through 3 are stabilized as anions owing to a strong electron attraction effect provided by the fluorine atoms and the sulfonyl groups. Thus ions show a high degree of dissociation. Thereby the thermosetting one-part polyurethane composition can be provided with an ionic-electroconductivity by adding a small amount of the anionic salts shown in the above-described chemical formulas 1 through 3 thereto. That is, owing to the addition of the anionic salts thereto, it is possible to minimize deterioration of the property thereof, the generation of blooming, and the migration contamination. The anionic salts are preferable because they are compatible with the polyol component. Further these salts have an effect of plasticizing the system and dissociate at a low temperature and a low humidity, thus imparting electroconductivity to the thermosetting one-part polyurethane composition to a high extent. Therefore these salts are capable of reducing the degree of dependence of the electric resistance on environment. These salts are chemically and electrochemically stable and can be used in a wide range of temperature and allow the electric resistance to be adjusted easily. Furthermore many of these salts are industrially available and powdery at the normal temperature. The powdery salts can be kneaded easily. In addition, the salts do not contain chlorine or bromine. Thus by using other components not containing chlorine or bromine, it is possible to form the thermosetting one-part polyurethane composition not containing chlorine or bromine. Therefore it is possible to eliminate a fear of occurrence of phenomena such as corrosion, rust, and contamination on the surface of the metal shaft of the electroconductive roller when salts having chloride ions or perchlorate ions (for example, quaternary ammonium perchlorate) are used and a possibility of generation of dioxine when the roller is destroyed by fire (burnt).

In the anion shown by the chemical formulas 1 through 3, $X_1$, $X_2$, and $X_3$ are functional groups, having 1 to 8 carbon atoms, which contain carbon atoms, fluorine atoms, and sulfonyl group ($-SO_2-$). As the functional groups $X_1$, $X_2$, and $X_3$, groups shown by $R-SO_2-$ (R indicates hydrocarbon group, having 1 to 8 degrees carbon atoms, replaced with fluorine atom) can be exemplified. As the hydrocarbon group having 1 to 8 carbon atoms, it is possible to list the following groups: alkyl groups such as methyl group, ethyl group, n-propyl group, isopropyl group, n-butyl group, isobutyl group, tert-butyl group, n-pentyl group, isopentyl group, tert-pentyl group, n-hexyl group, 1,1-dimethylpropyl group or 2,3-dimethylbutyl group; alkenyl group such as vinyl group, aryl group, 1-propenyl group, isopropenyl group, 2-butenyl group, 1,3-butadienyl group or 2-pentenyl group; and alkynyl group such as ethynyl group, 2-propynil group, 1-butynil group or 2-butynil group. The number of fluorine atom serving as the substituting group and the substituting position are not limited to specific ones.

In the anion shown by the chemical formulas 1, 2, and 3, in consideration of stability and handling properties, it is favorable that $X_1-$ of the chemical formula 1 through 3 is shown by $C_{n1}H_{m1}F_{(2n1-m1+1)}-SO_2-$, that $X_2-$ thereof is shown by $C_{n2}H_{m2}F_{(2n-m2+1)}-SO_2-$, and that $X_3-$ thereof is shown by $C_{n3}H_{m3}F_{(2n3-m3+1)}-SO_2-$ (n1, n2, and n3 may be identical to each other or different from each other and are integers 1 or larger, and m1, m2, and m3 may be identical to each other or different from each other and are integers 0 or larger). In consideration of the cost in addition to stability and handling properties, it is more favorable that $X_1-$ of the chemical formula 1 is shown by $C_{n1}H_{m2}F_{(2n-m1+1)}-SO_2-$ and that $X_2-$ thereof is shown by $C_{n2}H_{m2}F_{(2n2-m2+1)}-SO_2-$ or that $X_1-$ of the chemical formula 2 is shown by $C_{n1}H_{m1}F_{(2n1-m1+1)}-SO_2-$ (content of n1, n2, m1, and m2 is the same as that described above).

It is most favorable that $X_1-$ of the chemical formula 1 is shown by $C_{n2}H_{m1}F_{(2n1-m1+1)}-SO_2-$ and that $X_2-$ thereof is shown by $C_{n2}H_{m2}F_{(2n2-m2+1)}-SO_2-$ or that $X_1-$ of the chemical formula 2 is shown by $C_{n1}H_{m1}F_{(2n2-m2+1)}-SO_2-$ in consideration of a very favorable compatibility of the anions with the polyol component and a high performance of reducing the degree of dependence of the electric resistance on environment.

It is preferable that a cation that makes a pair with an anion shown by the chemical formulas 1 through 3 to form a salt is the cation of the alkali metals, the group 2A metals, the transition metals, the amphoteric metals. The alkali metals form stable anions because of a small ionization energy. Thus the anions of the alkali metals are preferable. Lithium is most favorable because it has a high electroconductivity.

In addition to cations of metal, it is possible to use cations shown by the chemical formulas 4, 5, and 6 shown below:

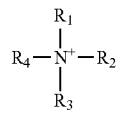

Chemical formula 4

Chemical formula 5

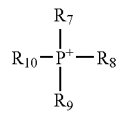

Chemical formula 6 where $R_1$ through $R_4$, $R_5$ and $R_6$, and $R_7$ through $R_{10}$ indicate alkyl groups, having 1 to 20 carbon atoms, which may have substituting groups and may be identical or different from each other.

As the alkyl groups having 1 to 20 carbon atoms in "the alkyl groups, having 1 to 20 carbon atoms, which may have substituting groups" indicated by $R_1$ through $R_4$, $R_5$ and $R_6$, and $R_7$ through $R_{10}$ methyl, ethyl, n-propyl, isopropyl, n-butyl, isobutyl, tert-butyl, n-pentyl group, isopentyl group, tert-pentyl group, n-hexyl, n-decyl are listed. As the substituting groups, alkylene oxide group, oxo group, alkanoyl group, (preferably $C_{2-8}$), carboxyl group, alkoxy carbonyl group, (preferably $C_{2-8}$), amino group, alkylamino group (preferably $C_{2-8}$), dialkylamino group (preferably $C_{2-16}$), cyclic amino group, alkylaminocarbonyl group (preferably $C_{2-8}$), hydroxyl group, nitro group, cyano group, mercapto group, alkylthio group, and phenyl group. These substituting groups may be substituted with halogen (preferably fluorine, chlorine, bromine).

The following salts can be preferably used as the anionic salt shown by the chemical formulas 1 through 3: Lithium-bis(trifluoromethanesulfonyl)imide $(CF_3SO_2)_2NLi$, lithium trifluoromethanesulfonate$(CF_3SO_3)Li$, $(C_2F_5SO_2)_2NLi$, $(C_4F_9SO_2)(CF_3SO_2)NLi$, $(FSO_2C_6F_4)(CF_3SO_2)NLi$, $(C_8F_7SO_2)(CF_3SO_2)NLi$, $(CF_3CH_2OSO_2)_2NLi$, $(CF_3CF_2CH_2OSO_2)_2NLi$, $(HCF_2CF_2CH_2OSO_2)_2NLi$, $((CF_3)_2CHOSO_2)_2NLi$, $(CF_3SO_2)_3CLi$, $(CF_3CH_2OSO_2)_3CLi$, $C_4F_9SO_3Li$ and potassium-bis (trifluoromethanesulfonyl) imide $(CF_3SO_2)_2NK$). These salts can be used singly or in combination. Above all, it is optimum to use salts of bis (fluoroalkylsulfonyl) imide ions and tris (fluoroalkylsulfonyl) methide ions because these salts have the effect of reducing the dependence degree of the electric resistance of the electroconductive roller on environment.

The anionic salts shown by the chemical formulas 1 through 3 are added at not less than 0.001 nor more than 10 parts by weight, favorably at not less than 0.01 nor more than 5 parts by weight, and more favorably not less than 0.02 nor more than 2 parts by weight to 100 parts by weight of the polyurethane composition forming the electroconductive cellular material layer. When the addition amount of the anionic salts which are shown by the chemical formulas 1 through 3 is less than 0.001 parts by weight, it is impossible for the salts to have a sufficient electroconductivity-imparting performance. When the addition amount of the salts is more than 10 parts by weight, it is impossible for the salts to have an improved electroconductivity-imparting performance, although the material cost becomes high.

The electroconductive cellular material layer of the electroconductive roller of the present invention is manufactured by the following method:

The foaming method includes a method using a chemical blowing agent, a method using a physical blowing agent, and a mechanical foaming method. In the method using the chemical blowing agent, a foaming reaction is liable to have variations in a foaming reaction. In the method using the physical blowing agent, although the degree of variation is lower than that of the method using the chemical blowing agent, there is a variation range of temperature in dependence on positions inside a mold. Thus there is a possibility of variation in the foamed state. Therefore in the present invention, the method of using the mechanical foaming is adopted.

As the mechanical method of foaming the polyurethane, one shot method, semi-prepolymer method, and complete prepolymer method are known. In the one shot method, components are mixed with each other without pre-treating them chemically and reacted with each other. In the semi-prepolymer method, first and second components are prepared. The first component comprises of a semi-prepolymer obtained by reaction between a part of a polyol component and all of an isocyanate component. The second component comprises of a mixture of remaining components. In the complete prepolymer method, the polyol component and the isocyanate component are reacted beforehand to obtain a prepolymer. A mixture of the prepolymer and other components are prepared.

In the present invention, the complete prepolymer method is adopted. This is because by preparing a one-part prepolymer, the polyurethane reaction proceeds uniformly and quantitatively. As a result, it is possible to prevent a foamed state from becoming nonuniform and the amount of polyisocyanate or polyol from becoming excessive. Thereby there is hardly a possibility that an excessive amount of the polyisocyanate or the polyol contaminates the electrophotographic photoreceptor.

In the one shot method and the semi-prepolymer method of preparing the two-part prepolymer, a curing reaction progresses. Thus as described above, it is very difficult to use the mechanical foaming in the one shot method and the semi-prepolymer method. Thereby the use of the blowing agent is indispensable in the one shot method and the semi-prepolymer method. Consequently the one shot method and the semi-prepolymer method have a problem that it is very difficult to obtain an electroconductive cellular material layer having foamed cells fine and uniform in the diameter thereof because of a nonuniform foamed state.

As apparent from the above description, in the present invention, it is preferable to adopt the mechanical foaming method of foaming the thermosetting one-part polyurethane composition to form the electroconductive cellular material layer. It is also preferable to foam the thermosetting one-part polyurethane composition by using a low-pressure gas in the range of 0.1 to 10 kgf/cm$^2$, as will be described in detail later.

The method of foaming the foamable thermosetting one-part polyurethane composition includes a first step of mixing a gas with the thermosetting one-part polyurethane composition; a second step of pressurizing a mixture fed out from the first step by a pump; and a third step of discharging the pressurized mixture through a conduit.

In the conventional mechanical froth method (method of mixing foams into material by mechanical stirring), a compressed gas is blown into a viscosity material. In this method, when the pressure of the gas to be mixed with the viscosity material is high, it is difficult to control a flow rate thereof. Further a very small error in the flow rate at the time of a high pressure becomes a large error in the flow rate at the time of an atmospheric pressure. For example, an error in the flow rate at 50 kgf/cm$^2$ becomes 50 times as large as the error at the time of the atmospheric pressure. Thus there is a large variation in the mixing ratio between the thermosetting one-part polyurethane composition and the gas. As a result, the foamed state becomes unstable and it is difficult to obtain a uniform foamed state.

On the other hand, according to the mechanical foaming method adopted in the present invention, it is possible to mix the gas with the thermosetting one-part polyurethane composition at a pressure as low as the atmospheric pressure and control the flow rate of the gas easily. Thereby it is possible to reduce a variation in the mixing ratio between the thermosetting one-part polyurethane composition and the gas and stabilize a foamed state. Thus it is possible to obtain uniform foaming.

In the first step, it is possible to use a method of supplying the gas into the pump in which the thermosetting one-part polyurethane composition is filled or a method of supplying the thermosetting one-part polyurethane composition into the pump in which the gas is filled. But it is preferable to use the latter method because in the latter method, a low-pressure gas is used, a mechanical mixing can be accomplished at a low pressure, and the gas can be dispersed uniformly.

In the second step, the mixture supplied from the first step is pressurized by the pump. The supplied pressure at this time is not less than 150 kgf/cm$^2$ and favorably in the range of 200 kgf/cm$^2$ to 250 kgf/cm$^2$. It is favorable that the first and second steps are executed by using a piston pump unit in which a piston reciprocates inside a cylinder to perform a suction step and a discharge step. It is more favorable that the piston pump in which the piston reciprocates inside the cylinder to perform the suction step and the discharge step is used to supply a low-pressure gas adjusted to the range of 0.1 to 10 kgf/cm$^2$ and favorably 0.1 to 5 kgf/cm$^2$ to the cylinder in the suction step of the piston pump and supply the thermosetting one-part polyurethane composition to the cylinder at a pressure in the range of 50 to 300 kgf/cm$^2$ and favorably 100 to 250 kgf/cm$^2$ after the suction step performed (first step). After the thermosetting one-part polyurethane composition is supplied to the cylinder, the discharge step of the piston pump is performed to pressurize the mixture of the gas and the thermosetting one-part polyurethane composition (second step).

It is preferable to divide the third step of foaming the mixture by discharging the pressurized mixture through the conduit into a process of dispersing the gas into the thermosetting one-part polyurethane composition by passing the pressurized mixture through the conduit and a process of discharging the mixture that has passed through the conduit.

As the conduit, a long pipe having a length of several meters to 2 to 20 meters is used. The pipe is wound straight, in the shape of a circular arc or spirally and mounted on a frame to use the pipe as a conduit for dispersing unit.

The mixture of the thermosetting one-part polyurethane composition and the gas passes through the conduit in a pressurized state. Thereby the gas is divided into fine particles by a shearing force. The fine particles of the gas are dispersed in the thermosetting one-part polyurethane composition.

In the first and second steps, the mixture of the thermosetting one-part polyurethane composition and the gas supplied from the first step can be applied to a power mixer or a static mixer to thereby disperse the gas finely and homogeneously into the thermosetting one-part polyurethane composition.

Air is used as the gas of the present invention. But carbon dioxide gas or nitrogen gas may be used instead of air.

It is possible to set the foaming magnification to not less than 100% nor more than 400% by using the mechanical foaming method adopted in the method of manufacturing the electroconductive roller having the electroconductive cellular material layer of the present invention. In the range of 100% to 400%, the foaming magnification can be adjusted as desired according to use of the electroconductive roller and the type of the image-processing apparatus. The foaming magnification can be established freely and easily by using the mechanical method for foaming the thermosetting one-part polyurethane composition that is mixed with the low-pressure gas. The thermosetting one-part polyurethane composition can be cured immediately at a temperature higher than the critical temperature for curing. Thus the foaming method has an advantage of reducing the cost of manufacturing the electroconductive roller having the electroconductive cellular material layer. The foaming magnification is favorably not less than 150% nor more than 350% and more favorably not less than 200% nor more than 300%.

The electroconductive roller of the present invention is formed as follows: After a foamable thermosetting one-part polyurethane composition containing a gas, a thermosetting polyurethane composition, and a latent curing agent prepared by inactivating a solid polyamine is injected into a mold after the foamable thermosetting one-part polyurethane composition is foamed, the foamable thermosetting one-part polyurethane composition is heated to a temperature not less than a thermosetting critical temperature for curing thereof.

The fluctuation range of the temperature of a heating/curing means is reduced by using the thermosetting one-part polyurethane composition showing a critical curing mechanism when the thermosetting one-part polyurethane composition is heated. Thereby it is possible to shorten the period of time required to foam and cure the thermosetting one-part polyurethane composition and thereby increase the productivity. Further after components of the foamable thermosetting one-part polyurethane composition are mixed with one another very uniformly and the foamable thermosetting one-part polyurethane composition foams very uniformly, the foamable thermosetting one-part polyurethane composition is injected into the mold. Thus even though the foamable thermosetting one-part polyurethane composition is molded in a mold as small as the electroconductive roller, the obtained electroconductive roller has a uniform hardness and a uniform foamed state, and the loss of the material is a few. Furthermore foamed cells are not broken after the foamed thermosetting one-part polyurethane composition is injected into the mold. Therefore the foamable thermosetting one-part polyurethane composition can be molded by a split-type mold which will be described later. Further the equipment for foaming the thermosetting one-part polyurethane composition has a simple construction and is excellent in its maintenance.

As the latent curing agent formed by inactivating the solid polyamine, it is preferable to use polyamine coated with fine particles. More specifically, fine particles whose diameters are not more than 2 µm are adhered to the surface of solid polyamine whose melting point is not less than 50° C. and whose particle diameter is not more than 20 µm. Thereby active amino groups of the solid polyamine are coated with the fine particles.

It is possible to use the following aromatic or aliphatic polyamines whose melting points are not less than 50° C.: Aromatic polyamines such as 4,4'-diaminodiphenylmethane, 2,4'-diaminodiphenylmethane, 3,3'-diaminodiphenylmethane, 3,4'-diaminodiphenylmethane, 2,2'-diaminobiphenyl, 2,4'-diaminobiphenyl, 3,3'-diaminobiphenyl, 2,4-diaminophenol, 2,5-diaminophenol, o-phenylenediamine, m-phenylenediamine, 2,3-tolylenediamine, 2,4-tolylenediamine, 2,5-tolylenediamine, 2,6-tolylenediamine, and 3,4-tolylenediamine; and aliphatic polyamines such as 1,12-dodecanediamine, 1,10-decanediamine, 1,8-octanediamine, 1,14-tetradecanediamine, and 1,16-hexadecanediamine. These polyamines can be used singly or in combination. The diameters of these polyamines are adjusted to not more than 20 µm and favorably to 3 to 15 µm. When the diameters thereof are more than 20 µm, the polyurethane composition is cured in an incomplete reaction. Thus it is very difficult for the polyurethane composition to obtain desired properties.

The inorganic fine particles can be selected from the titanium oxide, calcium carbonate, clay, silica, zirconia, alumina, and talc singly or in combination. The organic fine particles can be selected from carbon black and resins such as polyacrylic resin, polystyrene, and polyethylene. These substances can be used singly or in combination. The amount of use of the fine particles is so selected that the weight ratio between the solid polyamine and the fine particles is 1:0.001 to 0.5 and favorably 1:0.002 to 0.4. When the weight ratio of the fine particles to the solid polyamine is less than 0.001, the effect of storage stability cannot be obtained. When the weight ratio of the fine particles to the solid polyamine is more than 0.5, the storage stability cannot be improved. It is important to establish the diameter of the fine particles which has adhered to the polyamine to not more than 2 µm and favorably not more than 1 µm. When the diameter of the fine particles is more than 2 µm, the fine particles does not adhere to the solid polyamine.

The polyamine adhered and coated with the fine particles is manufactured as follows: While the solid polyamine is being pulverized to a predetermined diameter range, the fine particles is added to the solid polyamine and mixed with each other until the diameter of the fine particles becomes a predetermined diameter range. The fine particles can be adhered to the surface of the solid polyamine by using a shearing friction type mixing method. Further the polyamine coated with the fine particles is manufactured by applying the solid polyamine pulverized beforehand and the fine particles to a high-speed impact type mixing stirring machine, a compression shearing mixing stirring machine or a spray dry apparatus. It is preferable to use the high-speed impact type mixing stirring machine.

The viscosity of the thermosetting polyurethane composition is favorably not more than 250,000 cps and more favorably not more than 150,000 cps at 20° C. When the viscosity of the thermosetting polyurethane composition is higher than 250,000 cps at 20° C., the workability of injecting it into a mold is inferior. To facilitate molding, as the viscosity of the thermosetting polyurethane composition becomes lower, the flowability thereof can be improved increasingly. But the flowability of the thermosetting polyurethane composition is restricted by the viscosity of the prepolymer that is the material thereof. Thus the viscosity of the thermosetting polyurethane composition is not less than 1,000 cps.

As a mold into which the foamable thermosetting one-part polyurethane composition is injected, it is possible to use a split mold whose surface contacting a peripheral surface of an electroconductive cellular material layer is divided into two or more or a cylindrical mold whose surface contacting the peripheral surface of the electroconductive cellular material layer is not divided. Known materials can be used for the mold. Not only metal, but also resin such as polycarbonate can be used therefor. Above all, metal such as aluminum having a high thermal electroconductivity is preferable.

The thickness of the mold is not less than 0.5 mm nor more than 5 mm and favorably not less than 1 mm nor more than 3 mm. If the thickness of the mold is more than 5 mm, the mold has a low thermal electroconductivity and is heavy. On the other hand, if the thickness of the mold is less than 0.5 mm, the mold has a low mechanical strength. Thus there is a possibility that the mold may deform.

When the split mold whose surface contacting the peripheral surface of the electroconductive cellular material layer is divided into two or more is used, the foamed thermosetting one-part polyurethane composition is injected into the mold at a temperature less than the thermosetting critical temperature thereof. After a metal shaft to which a hot melt adhesive has been applied is set in at least one of the two parts of the mold, the parting faces of the two parts of the mold are mated. Thereafter the foamed thermosetting one-part polyurethane composition is heated to a temperature not less than the thermosetting critical temperature for curing thereof. Thereby the electroconductive cellular material layer can be formed with the metal shaft held in the electroconductive roller. This method is suitable for making a mass production at a low cost because the method allows the mold to be maintained easily and the electroconductive cellular material layer to be released therefrom easily and securely.

When the mold (cylindrical mold) whose surface contacting the peripheral surface of the electroconductive cellular material layer is not divided is used, release treatment is applied to the inner surface of the mold and/or a tube releasable from the mold is inserted into the mold. After the foamed thermosetting one-part polyurethane composition is injected into the mold at a temperature less than the thermosetting critical temperature thereof, the thermosetting one-part polyurethane composition is heated to a temperature not less than the thermosetting critical temperature thereof. Thereby the electroconductive cellular material layer can be formed. Because the release treatment is made for the inner surface of the mold, the electroconductive cellular material layer can be pulled out of the mold without dividing the mold. When the tube releasable from the mold is used, the electroconductive cellular material layer and the tube are pulled out of the mold without dividing the mold. Thereafter the tube is removed from the electroconductive cellular material layer as desired.

The metal shaft may be set inside the mold before the foamable thermosetting one-part polyurethane composition is injected thereinto or may be inserted into the mold after the electroconductive cellular material layer is formed.

This method is suitable for utilizing the tube as the outer layer of the electroconductive cellular material layer and manufacturing the electroconductive roller having the electroconductive cellular material layer without polishing the surface thereof.

Except the case in which the tube releasable from the mold is utilized as the outer layer of the electroconductive cellular material layer, it is preferable that the tube releasable from the mold is made of a flexible material which can be deformed by a force applied externally. As such a material, it is preferable to use resin such as ethylene tetrafluoride and rubber materials such as fluororubber and silicone rubber. It is preferable that the tube releasable from the mold has a thickness of 10 to 100 μm to release it from the electroconductive cellular material layer easily.

In the method of manufacturing the electroconductive roller of the present invention, when the foamable thermosetting one-part polyurethane composition is injected into the mold, the space inside the mold into which the foamable thermosetting one-part polyurethane composition is injected is pressurized beforehand. Thereafter the foamable thermosetting one-part polyurethane composition can be injected thereinto while the pressure in the space is being decreased.

The pressure to be applied beforehand to the space into which the foamable thermosetting one-part polyurethane composition is injected can be appropriately selected in dependence on the viscosity of the foamable thermosetting one-part polyurethane composition so that foamed cells can be prevented from being broken. But it is preferable to set the pressure to not less than 0.3 atm nor more than 2 atm.

The construction of the electroconductive roller having the electroconductive cellular material layer of the present invention is not limited to a specific one, provided that it has the electroconductive cellular material layer. But it is preferable that the electroconductive roller has the electroconductive cellular material layer on the outermost layer or inward from the surface coating layer. When the electroconductive roller having the electroconductive cellular material layer is desired to be manufactured at a low cost, it is preferable that the surface coating layer is not formed and that the electroconductive cellular material layer is formed on the outermost layer. A metal shaft is mounted on a hollow portion of the roller. The material of the metal shaft is not limited to a specific one, but a metal shaft made of aluminum, aluminum alloy, SUS or iron or ceramic is used.

One electroconductive cellular material layer may be formed on the peripheral surface of the metal shaft or two or three layers may be provided in addition to the electroconductive cellular material layer to adjust the electric resistance of the roller. According to demanded performance, the disposition of a plurality of layers, the layering order of the layers except the outermost layer, and the thickness of the entire layers can be appropriately set. But it is preferable that only one electroconductive cellular material layer is formed on the peripheral surface of the metal shaft, because there is no variations between electroconductive rollers, and the electroconductive roller can be manufactured at a low cost.

The electroconductive roller of the present invention can be preferably used for an image-processing mechanism of an electrophotographic apparatus of office appliances such as a laser beam printer, a copying apparatus, a facsimile, and the like. More specifically, the electroconductive roller can be preferably used as a transfer roller for transferring a toner image from an electrophotographic photoreceptor to paper or from the electrophotographic photoreceptor to an intermediate transfer belt or from the intermediate transfer belt to paper; and a toner supply roller for transporting toner. In addition, the electroconductive roller can be used as a charging roller for uniformly charging an electrophotographic drum, a paper supply roller, and a transport roller in an image-processing mechanism which is required to have antielectrification treatment for problems which occur owing to attachment of paper powder and generation of static electricity. Further the electroconductive roller can be used as a developing roller for attaching toner to the electrophotographic photoreceptor and a driving roller for driving a transfer belt in a direction from the inner side thereof.

The electroconductive roller of the present invention has the electroconductive cellular material layer in which foamed cells are fine and uniform in the diameter thereof. Further the electroconductive roller has a low and uniform hardness and little variations in its electric resistance. Thus the electroconductive roller provides a uniform image. In addition, although fine toner is used, toner contamination can be prevented. Further the electroconductive roller provides an image having a resolution corresponding to the diameter of toner. Therefore the electroconductive roller is capable of coping with the present tendency of using fine toner. Furthermore the electroconductive cellular material layer of the present invention is made of the polyurethane composition and does not contain a chlorine-containing material or a bromine-containing material such as epichlorohydrin rubber. Thus there is no fear that the electroconductive roller contaminates environment when it is burnt for disposal and the electroconductive roller can be disposed at a lost cost. In particular, the electroconductive roller is preferable because it does not contain the chlorine-containing material, the bromine-containing material, and a heavy metal-containing material.

In the conventional electroconductive roller having the electroconductive cellular material layer, when a foam is formed in a mold having a size not much different from that of the electroconductive roller, there is a large variation in a foamed state in the mold. Thus in the conventional art, a large foam having a metal shaft provided at its center is cut to obtain a roller. Therefore there is an increase in the manufacturing cost required for the material of a margin of the roller to be abraded and an increase in waste generated by abrasion. On the other hand, in the method of the present invention for manufacturing the electroconductive roller having the electroconductive cellular material layer, the foam can be formed in a mold having a size not much different from that of the electroconductive roller. Thereby it is possible to reduce the amount of waste because the roller does not have a margin to be abraded and the material cost. Further the electroconductive roller of the present invention has a uniform hardness and foaming magnification.

Moreover by using the electroconductive roller having the electroconductive cellular material layer of the present invention for an image-processing apparatus, it is possible to provide a high-quality image, make toner fine, make the image-processing apparatus small owing to reduction of the capacity of the power source caused by reduction of the degree of dependence of the electric resistance on environment, save energy, and realize efficient and high-speed development.

BRIEF DESCRIPTION OF THE DRAWINGS

FIG. 2 shows a mold for use in manufacturing the electroconductive roller having an electroconductive cellular material layer of the present invention, in which

DETAILED DESCRIPTION OF THE PREFERRED EMBODIMENTS

The embodiments of the electroconductive roller having the electroconductive cellular material layer of the present invention will be described below with reference to the drawings.

Reaction is made between a polyol component and an excessive amount of a polyisocyanate compound to obtain a urethane prepolymer containing isocyanate groups. As the polyol component, trifunctional PPG polyether polyol is used or the polyol and silicon modified polyol are used in combination.

An isophorone diisocyanate compound is used as the polyisocyanate compound.

Anionic salts shown by the chemical formulas 1, 2, and 3 represented by lithium-bis(trifluoromethanesulfonyl)imide is added to the urethane prepolymer as an ionic-electroconductive agent. The concentration of the salt is set to not less than 0.001 parts by weight nor more than 10 parts by weight in the composition of an obtained foam.

As a catalyst, a curing catalyst such as octynoate of diazabicyclo (5,4,0) undecene-7 (abbreviated as DBU) is added to the urethane prepolymer.

Fine particles, having a diameter of 0.1 μm to 50 μm, which comprise of methyl methacrylate, styrene, acrylonitrile or a homopolymer of a monomer having vinyl double bond groups or a copolymer of the monomer are added to the urethane prepolymer as a filler.

A foam stabilizer is added to the urethane prepolymer. As the foam stabilizer, polyol which is the material of the polyurethane prepolymer is introduced into the molecular structure thereof. In addition, as the foam stabilizer, it is possible to use silicone surface active agents such as polyether modified silicone oligomer containing ethylene oxide, propylene oxide, and the like; fluorine surface active agents such as perfluoroalkyl sulfonate, ammonium salt of perfluorooctoate, and potassium salt of perfluoroalkyl-N-ethylsulfonylglycine; and hydrocarbon surface active agents such as polyoxyethylene alkylether.

The polyurethane prepolymer and the latent curing agent formed by inactivating the solid polyamine are added to the polyurethane composition, or to the thermosetting one-part polyurethane composition in such a way that the equivalent ratio between the isocyanate group of the polyurethane prepolymer and the amino group of the thermally activated latent curing agent is 1:0.5 to 2.0.

As the latent curing agent, polyamine coated with fine particles is used. The polyamine coated with fine particles is formed by fixing fine particles whose diameters are about 2 μm to the surface of solid polyamine whose melting point is not less than 50° C. and whose particle diameter is about 20 μm. Thereby active amino groups of the solid polyamine are coated with the fine particles.

Figure 1:
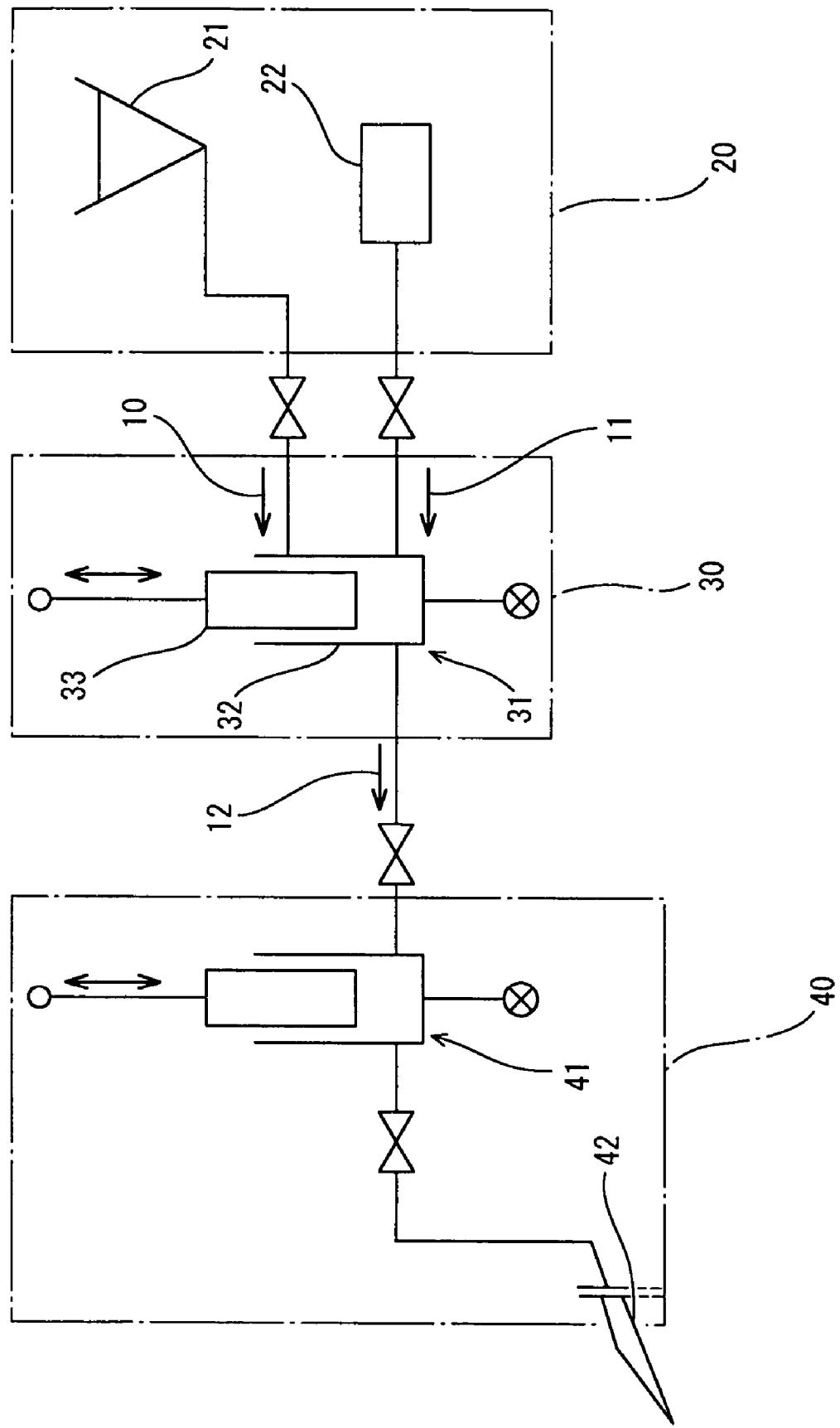
FIG. 1 is a circuit system view showing the construction of a foaming apparatus for use in the method of manufacturing the electroconductive roller of the present invention.
Figure 2A:
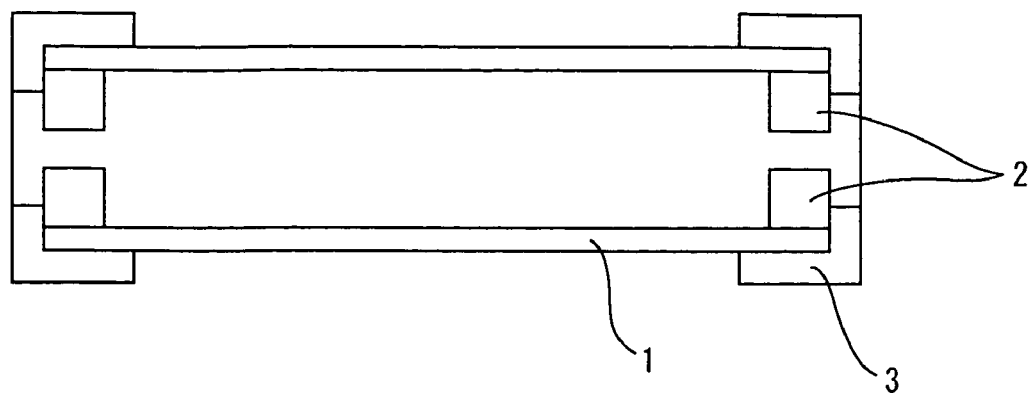
FIG. 2A is vertical sectional view showing the mold.
Figure 2B:
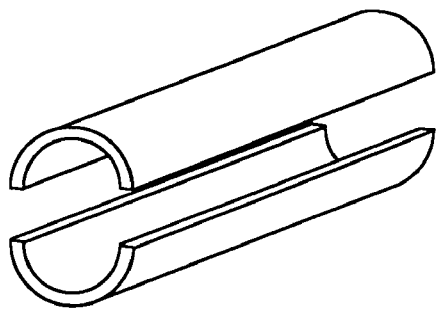
FIG. 2B is a perspective view showing a member 1 divided into two parts.
Figure 2C:
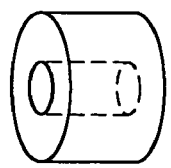
FIG. 2C is a perspective view showing a member 2.
Figure 2D:
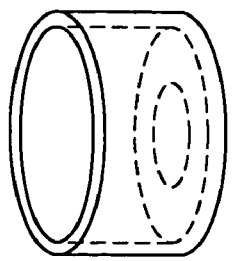
FIG. 2D is a perspective view showing a member 3.

FIG. 1 is a circuit system diagram showing the construction of a foaming apparatus which is used to manufacture the electroconductive roller having the electroconductive cellular material layer of the present invention.

A supply apparatus 20 includes a supply source 21 supplying the thermosetting one-part polyurethane composition and a gas supply source 22. A piston pump 31 includes a cylinder 32 and a piston 33. The piston 33 reciprocates inside the cylinder 32 to perform a suction step and a discharge step.

In the suction step of the piston pump 31, the gas 11 is supplied to the cylinder 32 from the gas supply source 22. Thereafter the thermosetting one-part polyurethane composition is supplied to the cylinder 32 from the supply source 21. Thereafter the discharge step of the piston pump 31 is performed. More specifically, a material discharge apparatus 40 feeds a mixture of the gas 11 and the thermosetting one-part polyurethane composition 10 under pressure. Thereafter a piston pump 41 of the discharge apparatus 40 discharges a foamable thermosetting one-part polyurethane composition 12 from a nozzle 42.

The discharged foamable thermosetting one-part polyurethane composition 12 is injected into a mold at a temperature not more than a thermosetting critical temperature thereof. Thereafter the foamable thermosetting one-part polyurethane composition 12 is heated for 10 minutes at a temperature not less than its thermosetting critical temperature, namely, 100° C. The foamable thermosetting one-part polyurethane composition 12 curing instantly to obtain the electroconductive cellular material layer.

Finally the surface of the electroconductive cellular material layer is abraded to a predetermined dimension. In this manner, the electroconductive roller having the electroconductive cellular material layer of the present invention is manufactured.

The examples of the present invention and comparison examples will be described below.

SYNTHESIS EXAMPLE 1 THROUGH 3 OF URETHANE PREPOLYMER

Reaction was made among the components used at the ratios shown in the table shown below to synthetically prepare the urethane prepolymer in a reaction container from which water was eliminated. The reaction period of time was three hours. The reaction temperature was 80° C.

PREPARATION EXAMPLE (LATENT CURING AGENT)

30 parts by weight of titanium dioxide powder having a diameter of 0.3 μm and 100 parts by weight of 1,12 dodecanediamine (melting point: 71° C.) having a diameter of 20 μm were mixed with each other. Thereafter the mixture was pulverized by using a jet mill to obtain 130 parts by weight of polyamine coated with fine particles having a diameter of 10 μm.

EXAMPLE 1 THROUGH 4 OF MANUFACTURING THERMOSETTING ONE-PART URETHANE COMPOSITION

The thermosetting one-part urethane composition was obtained by using the urethane prepolymer of the synthesis example 1 through 3 and the latent curing agent of the preparation example used at the ratios shown in the table shown below.

Example of manufacturing thermosetting one-part urethane composition

| | Compound | Manufacturing example 1 | Manufacturing example 2 | Manufacturing example 3 | Manufacturing example 4 |
|---|---|---|---|---|---|
| | Synthesis example 1 of prepolymer | 100 | | 100 | |
| | Synthesis example 2 of prepolymer | | 100 | | |
| | Synthesis example 3 of prepolymer | | | | 100 |
| Crosslinking agent | Polymethylene polyphenyl polyisocyanate | 1 | 1 | 1 | 1 |
| Latent curing agent | Shown in "Preparation example" | 7.2 | 7.2 | 7.2 | 8.6 |
| Surface active agent | Polyether modified polyorganosiloxane | | 0.5 | | |
| Filler | Powdered acrylate copolymer (average polymerization degree: 2000, average particle diameter: 1 μm) | 10 | 10 | 10 | |
| Coloring agent | Carbon black | 0.5 | 0.5 | 0.5 | 0.5 |
| Catalyst | 1,8-(diazabicyclo(5,4,0)undecene-7, p-toluenesulfonate | 0.1 | 0.1 | | 0.1 |
| Catalyst | Dibutyltin bisacetylacetonate | | | 0.03 | |
| Salt (ionic-electroconductive agent) | Lithium-bis (trifluoromethanesulfonyl) imide | | | 0.05 | |
| | Viscosity (mPa · s) | 80000 | 85000 | 80000 | 130000 |

Synthesis example of urethane prepolymer

| | Synthesis example 1 | Synthesis example 2 | Synthesis example 3 |
|---|---|---|---|
| Polyether polyol (molecular weight: 6000, trifunctional, mol ratio between ethylene oxide and propylene oxide = 2:8) | 2100 | 2100 | 2100 |
| Silicon modified polyol (molecular weight: 2400, bifunctional, polyorganosiloxane-terminated polyether glycol) | 24 | | 24 |
| Isophorone diisocyanate | 237 | 232 | |
| 4,4-diphenylmethane diisocyanate | | | 292 |
| Dibutyltin dilaurate | 0.1 | 0.1 | 0.1 |
| Diisononyl phthalate | | | 250 |
| NCO % | 1.8 | 1.8 | 2.2 |
| Viscosity (mPa · s) | 44000 | 46000 | 65000 |

EXAMPLE 1

The foamable thermosetting one-part polyurethane composition was formed by using the foaming apparatus shown in FIG. 1.

More specifically, after the suction step of the piston pump 31 disposed inside the mixing apparatus 30 is performed, dry air 11 was introduced from the gas supply source 22 into the cylinder 32 of the piston pump 31 decreased to a low pressure by the piston 33. After the dry air 11 was introduced into the cylinder 32, the thermosetting one-part polyurethane composition 10 was introduced from the thermosetting one-part polyurethane composition supply source 21 into the cylinder 32 accommodating the dry air 11. Thereafter the discharge step of the piston pump 31 was performed to obtain the foamable thermosetting one-part polyurethane composition 12 containing the thermosetting one-part polyurethane composition 10 mixed with the dry air 11.

The foamable thermosetting one-part polyurethane composition 12 was injected into a mold from the tip of the nozzle 42 to obtain a foam. More specifically, as shown in FIG. 2, a mold divided into two parts at a portion which contacts the peripheral surface of the electroconductive cellular material layer was used. The foamed thermosetting one-part polyurethane composition 12 was charged into both parts of the mold. The thickness of the cylindrical portion of the mold was 2 mm. The foamable thermosetting one-part polyurethane composition 12 was heated at a temperature, namely, 23° C. less than the thermosetting critical temperature thereof.

After a metal shaft to which a hot melt adhesive had been applied was set in one of the two parts of the mold, the parting faces of the two parts of the mold are mated. Thereafter the foamable thermosetting one-part polyurethane composition was heated at a temperature, namely, 100° C. not less than the thermosetting critical temperature thereof for about 10 minutes. Thereby the electroconductive cellular material layer composed of the ionic-electroconductive polyurethane composition was formed on the periphery of the metal shaft.

Finally the surface of the electroconductive cellular material layer was abraded to a predetermined dimension. In this manner, the electroconductive roller having the electroconductive cellular material layer was manufactured.

EXAMPLES 2 THROUGH 5

An electroconductive roller having the electroconductive cellular material layer of each of the examples 2 through 5 was manufactured by using a mold different from the mold of the example 1.

COMPARISON EXAMPLE 1

The roller of the comparison example 1 was a transfer roller mounted in an 18 ppm professional laser printer HL-1850 manufactured by Brother Kogyo Inc. More specifically, the electroconductive cellular material layer of the transfer roller had an inner diameter of 6 mm, an outer diameter of 15 mm, and an axial length of 231 mm. The roller had a metal shaft disposed at its center. The electroconductive cellular material layer was made of polyurethane composed of isocyanate and a polyol component obtained by mixing PPG polyol and PTMG polyol with each other.

COMPARISON EXAMPLE 2

The roller of the comparison example 2 was made of epichlorohydrin-ethylene oxide-allyl glycidyl ether copolymer rubber (GECO) formed in the process described below.

The components of the rubber composition for the electroconductive roller were kneaded by using an enclosed-type kneader or an open roll. The mixing ratios of the components were as shown in table 1 shown below. The rubber composition taken out from the kneader in the form of a ribbon was supplied to a rubber extruder having ø60 to extrude it as a hollow tube. After the raw rubber tube was cut to a proper length, it was vulcanized at 160° C. for 30 minutes to obtain a foamed rubber tube. As the vulcanizing means, a steam sealing type vulcanizer was used. A metal shaft having the same configuration as that of the transfer roller of the comparison example 1 was prepared. After a hot melt adhesive was applied to the metal shaft, the metal shaft was inserted into the foamed vulcanized rubber tube. After the foamed vulcanized rubber tube was heated to bond the shaft thereto, both ends of the rubber part of the roller was cut to a predetermined dimension. The surface of the roller was abraded to obtain the roller of the comparison example 2 having the same size as that of the roller of the comparison example 1.

As a result of abrasion of the surface of the roller of the comparison example 2, the diameter of the roller was reduced to 15 mm from 22 mm.

The abrasion amount of the roller of the comparison example 2 was much more than that of the rollers of the examples. More specifically, the volume of abrasive powder of the comparison example 2 was about 8 times as large as that of the example 1. Because the abrasive powder contained chlorine, the roller could not be heated to discard it. Thus the cost for discarding the roller is higher than the cost for destroy the rollers of the example 1.

TABLE 1

| Chemicals | Detail of chemicals (name = commercial name) | Detail of chemicals (maker) | Mixing rate |
|---|---|---|---|
| Epichlorohydrin rubber (*1) | Epichlomer CG104 | Daiso Co., Ltd. | 100 |
| Filler 1 | Precipitated calcium carbonate | Maruo Calcium Co., Ltd. | 20 |
| Filler 2 (HAF carbon) | Sheast 3 | Tokai Carbon Co., Ltd. | 2 |
| Hydrotalcite-like compound | DHT-4A-2 | Kyowa Chemical Industry | 3 |
| Zinc oxide | Ginrei R | Toho Aen | 5 |
| Stearic acid | 4931 | Uniqema Australia | 1 |
| Vulcanizing agent 1 | Powdery sulfur | Tsurumi kagaku Kogyo Inc. | 0.5 |
| Vulcanizing accelerator 1(dibenzothiazolyl disulfide) | Nocceler DM | Ouchishinko Chemical Industrial Co., Ltd. | 0.5 |
| Vulcanizing accelerator 2(tetramethylthiuram monosulfide) | Nocceler TS | Ouchishinko Chemical Industrial Co., Ltd. | 0.17 |
| Vulcanizing agent 2(ethylene thiourea) | Accel 22-S | Kawaguchi Chemical Industrial Co., Ltd. | 1.33 |
| Vulcanizing accelerator 3(di-ortho-tolylguanidine) | Nocceler DT | Ouchishinko Chemical Industrial Co., Ltd. | 1.13 |
| Blowing agent (4,4'oxybis(benzene sulfonyl hydrazide)) | Neocellborn N#1000SW | Eiwa Chemical Ind. Co., Ltd. | 6 |

(*1): Epichlorohydrin rubber is an epichlorohydrin copolymer in which ethylene oxide (EO), epichlorohydrin (EP), allyl glycidyl ether (AGE) are copolymerized at 34.5 mol %, 63 mol %, and 2.5 mol % respectively. The glass transition temperature (Tg) is −41° C.

Various properties of the electroconductive roller having the electroconductive cellular material layer of each of the examples 1 through 5 and that of the comparison examples 1 and 2 were measured as follows:

Measurement of Electric Resistance of Roller

Figure 3:
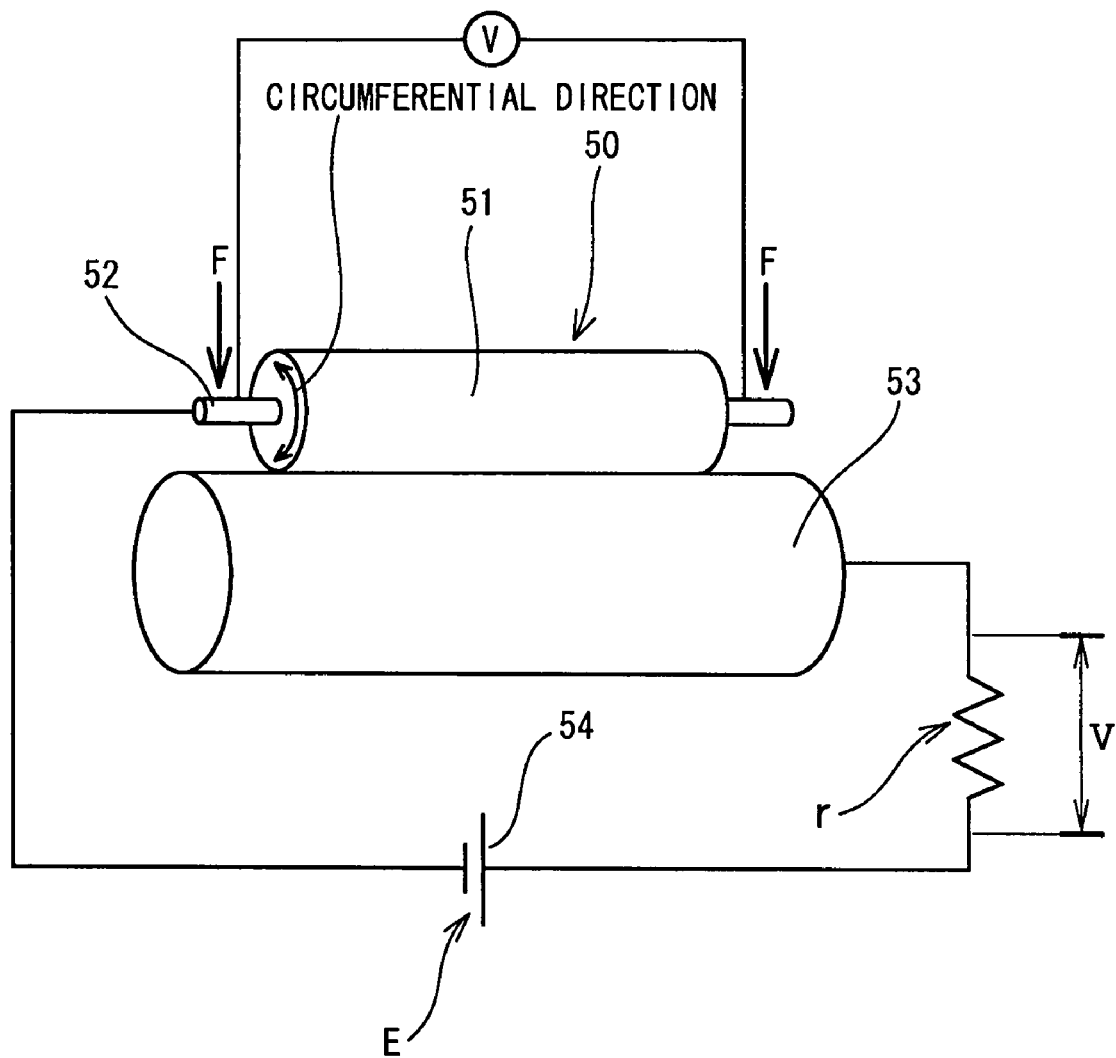
FIG. 3 shows the method of measuring the electric resistance of the electroconductive roller.

As shown in FIG. 3, at a temperature of 23° C. and a relative humidity of 55%, an electroconductive cellular material layer 51 having a metal shaft 52 inserted therethrough was mounted on an aluminum drum 53 having an outer diameter of 30 mm, with the electroconductive cellular material layer 51 in contact with the aluminum drum 53. The leading end of a conductor having an internal electric resistance of r (100Ω to 10 kΩ) was connected to the positive side of a power source 54 and to one end surface of the aluminum drum 53. The leading end of another conductor was connected to the negative side of the power source 54 and to one end surface of the metal shaft 52. A load F of 500 g was applied to both ends of the metal shaft 52. The aluminum drum 53 was rotated to indirectly rotate an electroconductive roller 50 having an electroconductive cellular material layer, while a voltage of 1000V was applied between the metal shaft 52 and the aluminum drum 53. At this time, the electric resistance of the electroconductive roller 50 having the electroconductive cellular material layer was measured 36 times circumferentially. The average of the 36 electric resistance was computed. The value of the internal electric resistance r was adjusted in such a way that the significant digits of measured values were as large as possible in conformity to the level of the electric resistance of the electroconductive roller 50 having the electroconductive cellular material layer. Supposing that a voltage applied to the apparatus is E, the electric resistance R of the electroconductive roller 50 having the electroconductive cellular material layer is: $R=r \times E/(V-r)$. Because the term of $(-r)$ is regarded as being slight, $R=r \times E/V$. The electric resistance R of the electroconductive roller 50 having the electroconductive cellular material layer was computed from a detected voltage V applied to the internal resistance r.

Measurement of Degree of Dependence of Electric Resistance on Environment

The electric resistance of each electroconductive roller was measured in a low-temperature and low-humidity (10° C., a relative humidity of 15%) environment and in a high-temperature and high-humidity (32.5° C., relative humidity of 90%) environment. To obtain the index of the dependence degree of the electric resistance of each roller on environment, computations were performed on the difference between the common logarithm $\log_{10} R_{LL}$ of the electric resistance $R_{LL}$ of the roller in the low-temperature and low-humidity environment and the common logarithm $\log_{10} R_{HH}$ of the electric resistance $R_{HH}$ thereof in the high-humidity and high-humidity environment.

Circumferential Nonuniformity of Electric Resistance

By using the apparatus shown in FIG. 3, a load F of 500 g was applied to both ends of the metal shaft 52 at a temperature of 23° C. and a relative humidity of 55%. The aluminum drum 53 was rotated the electroconductive roller at 30 rpm. While the electroconductive roller was rotating, a voltage of 1000V was applied between the metal shaft 52 and the aluminum drum 53 to compute the index value of the circumferential nonuniformity (maximum electric resistance in circumferential direction/minimum electric resistance in circumferential direction) of the electric resistance of the electroconductive roller.

Compression Set

Using specimens obtained by radially cutting the obtained electroconductive roller at regular intervals of 10 mm parallel with the end surface thereof, the compression set of each electroconductive roller was measured at a temperature of 70° C. for 22 to 24 hours at a compression rate of 25% in accordance with the method of testing compression set of vulcanized rubber and thermoplastic rubber specified in JIS K6262. If the value of the compression set exceeds 30%, the dimensional change of the roller is so large that when the roller is used as a transfer roller, a strain is generated in a printed image. Hence there is a high possibility that the roller cannot be put into practical use. The value of the compression set is favorably not more than 25%, more favorably not more than 15%, and most favorably not more than 10%.

Test of Test for Checking Stain of Photosensitive Member

The electroconductive roller of each of the examples and the comparison examples was kept for two weeks at 32.5° C. and at a relative humidity of 90%, with each electroconductive roller pressed against an electrophotographic photoreceptor set in a cartridge (cartridge type C4127X) of a laser beam printer of Laser Jet 4050 produced by Hewlett Packard Inc. After each electroconductive roller was removed from the electrophotographic photoreceptor, half-tone printing was carried out by the printer accommodating the electrophotographic photoreceptor. Whether or not printed sheets of paper were contaminated was checked by the following three criteria:

○: Printed paper was not contaminated apparently.

Δ: Low degree of contamination (when five sheets of paper were printed, contamination was hardly visible and thus there is no problem in use).

X: High degree of contamination (when not less than five sheets of paper were printed, contamination was visible)

Extraction Percentage by Acetone

A component is extracted for six hours from a specimen smaller than 2 mm square obtained by cutting the electroconductive roller of each of the examples and the comparison examples by using a Soxhlet apparatus and acetone as a solvent. The percentage (wt %) of the weight of the extracted component to the weight of resin before extraction was measured.

A Formed Cell Diameter and Variation of Foamed Cell Diameter.

An SEM photograph of foamed cells in a range of 1.5 mm×1 mm was taken at ×100 magnification on the circular surface of each electroconductive roller at two points spaced by 15 mm from both ends thereof and at the center point in its longitudinal (axial) direction, at a point disposed radially inward by 5 mm from each of these three points, and at a point disposed radially inward by 10 mm from each of these three points. Therefore SEM photograph was taken at 3×3=9 points. The photograph was enlarged and printed. The printed photograph was read by a scanner and binarized by an image-processing software to discriminate the foamed cells. Thereafter computations were performed to find an average particle diameter (μm) in all the photographs, a maximum foamed cell diameter, and a minimum foamed cell diameter by analysis. Thereby the foamed cell-diameter variation ΔD (μm)=maximum foamed cell-diameter−minimum foamed cell-diameter was computed.

Measurement of Hardness

Each roller was rotated 4 times by 90 degrees at a time in the circumferential direction thereof. The hardness of the roller was measured at two points spaced by 15 mm from both ends of the roller and the center point in its longitudinal (axial) direction. Therefore the hardness of the roller was measured at 3×4=12 points. The average value of the hardness was computed for each roller. The hardness variation ΔHs=a maximum value of the 12 points−a minimum value thereof was also computed. To measure the hardness of the roller, a load of 500 gf was applied to left and right portions of the shaft thereof in environment of temperature of 23° C. and a relative humidity of 55%. The hardness of each roller was measured by using a type-E durometer specified in JIS K6253.

Measurement of Electrostatic Capacity

Figure 4:
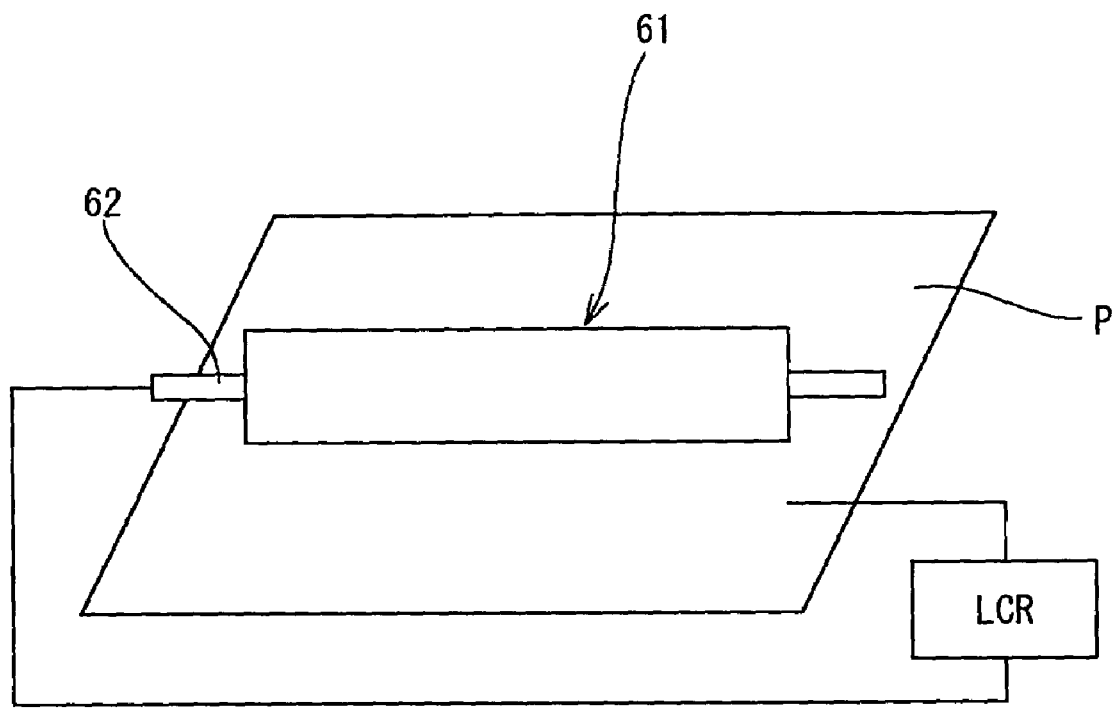
FIG. 4 is an explanatory view for explaining the method of measuring an electrostatic capacity.

The electrostatic capacity of each roller was measured by an LCR meter (manufactured by Toyo Technica Inc.) More specifically, as shown in FIG. 4, a voltage was applied between a shaft 62 of the roller and an aluminum plate P on which an electroconductive roller 61 was mounted in environment of temperature of 23° C. and a relative humidity of 55%. The R (resistance) component and C (capacitor) component were measured in a parallel circuit by using an LCR meter. The electroconductive roller was fixed to the aluminum plate P by applying a load of 500 gf to both ends of the shaft 62. The electrostatic capacity of roller was measured by applying an alternating voltage of a sine wave having an amplitude of ±3V.

Evaluation of Toner Dispersion

Toner dispersion was evaluated by using an 18 ppm professional laser printer HL-1850 manufactured by Brother Kogyo Inc. Monochrome lines having a width of 100 μm were printed out for evaluation.

Results of measurement of the above-described properties are shown in the table shown below.

TABLE 2-1

|  |  | Example 1 | Example 2 | Example 3 | Example 4 |
|---|---|---|---|---|---|
| Material of roller |  | Manufacturing example 1 | Manufacturing example 1 | Manufacturing example 2 | Manufacturing example 3 |
| Method of manufacturing roller | Mold | Split | Integral | Integral | Split |
| Method of manufacturing roller | Pressure in injection | Normal pressure | Normal pressure | Pressurized | Normal pressure |
| Electric resistance of roller | $\text{Log}_{10}R\ (\Omega)$ | 7.9 | 7.9 | 8.0 | 7.7 |
| Dependence of electric resistance of roller on environment |  | 1.3 | 1.3 | 1.3 | 1.0 |
| Index of circumferential nonuniformity of electric resistance of roller |  | 1.10 | 1.09 | 1.30 | 1.12 |
| Compression set | % | 9 | 8 | 9 | 8 |
| Test for checking stain of photosensitive member |  | ○ | ○ | ○ | ○ |
| Extraction percentage by acetone | % | 6.1 | 6.1 | 5.7 | 6.1 |
| Average diameter of foamed cell | μm | 51 | 48 | 78 | 50 |
| Variation Δ D of foamed cell diameter | μm | 15 | 14 | 45 | 15 |
| Average hardness Hs | E hardness | 23 | 23 | 20 | 22 |
| Hardness variation Δ Hs | degree | 1 | 0 | 3 | 1 |
| Electrostatic capacity | PF | 35 | 35 | 30 | 40 |
| Evaluation of toner dispersion |  | Not dispersed | Not dispersed | Not dispersed | Not dispersed |

TABLE 2-2

|  |  | Example 5 | Comparison example 1 | Comparison example 2 |
|---|---|---|---|---|
| Material of roller |  | Manufacturing example 4 |  | Rubber |
| Method of manufacturing roller | Mold | Split |  |  |
| Method of manufacturing roller | Pressure in injection | Normal pressure |  |  |
| Electric resistance of roller | $\text{Log}_{10}R\ (\Omega)$ | 7.6 | 7.7 | 7.0 |
| Dependence of electric resistance of roller on environment |  | 1.2 | 1.6 | 1.7 |
| Index of circumferential nonuniformity of electric resistance of roller |  | 1.15 | 1.30 | 1.10 |
| Compression set | % | 21 | 18 | 18 |
| Test for checking stain of photosensitive member |  | Δ | ○ | ○ |
| Extraction percentage by acetone | % | 19 | 1.3 | 5 |
| Average diameter of foamed cell | μm | 49 | 130 | 85 |
| Variation ΔD of foamed cell diameter | μm | 16 | 110 | 56 |
| Average hardness Hs | E hardness | 37 | 30 | 38 |
| Hardness variation ΔHs | degree | 2 | 4 | 7 |
| Electrostatic capacity | PF | 37 | 38 | 70 |
| Evaluation of toner dispersion |  | Not dispersed | Not dispersed | dispersed |

"Split" in the item of mold means that injection and molding were carried out by using the above-described method and using the mold (split mold) whose surface contacting the peripheral surface of the electroconductive cellular material layer is divided into two or more. "Integral" in the item of mold means that injection and molding were carried out by using the above-described method and using the mold (cylindrical mold) whose surface contacting the peripheral surface of the electroconductive cellular material layer is not divided.

As apparent from table 2, in the comparison examples 1 and 2, the foamed cell-diameter variation ΔD was not less than 50 μm, and the average foamed cell diameter was comparatively large, namely, in the range of 85 μm to 130 μm. The hardness variation ΔHs was also comparatively large, namely, not less than 4 degrees. The dependence degree of the electric resistance of the roller on environment was also high. The compression set was also high. On the other hand, in the examples 1 through 5, preferable results were obtained. More specifically, in the examples 1 through 4, the compression set was very low and there was no contamination on the electrophotographic photoreceptor. In the examples 1, 2, and 4, the average foamed cell diameter and the foamed cell-diameter variation ΔD were also small. In the example 4, the dependence degree of the electric resistance of the roller on environment was very low.

What is claimed is:

1. An electroconductive roller comprising an electroconductive cellular material layer, comprised of a polyurethane composition, which has an average foamed cell diameter not less than 20 μm nor more than 100 μm and a variation ΔD of said cell diameter not more than 50 μm, and
said electroconductive roller having a hardness variation ΔHs not more than 8 degrees and an index $R_{MAX}/R_{MIN}$ of a circumferential non-uniformity in an electrical resistance (Ω) thereof not more than 1.3.

2. The electroconductive roller according to claim 1, wherein said electroconductive cellular material layer is comprised of a thermosetting one-part polyurethane composition foamed by a mechanical foaming method.

3. The electroconductive roller according to claim 1, wherein a relationship of $\log_{10}R_{LL} - \log_{10}R_{HH} \leq 1.4$ is satisfied between an electric resistance $R_{LL}(\Omega)$ of said electroconductive roller at a low temperature and a low humidity (10° C., relative humidity: 15%) and an electrical resistance $R_{HH}(\Omega)$ thereof at a high temperature and a high humidity (32.5° C., relative humidity: 90%).

4. The electroconductive roller according to claim 1, wherein an electrostatic capacity measured at 100 Hz is not more than 50 pF; and an electrical resistance (Ω) at an applied voltage of 1000V is not more than $10^{12}\Omega$.

5. The electroconductive roller according to claim 1, wherein when a component is extracted from said electroconductive cellular material layer for 6 hours by using a Soxhlet apparatus and acetone as a solvent, a ratio of a weight of said component to a weight of a resin measured before said extraction is not more than 20%.

6. The electroconductive roller according to claim 1, wherein when a component is extracted from said electroconductive cellular material layer for 6 hours by using a Soxhlet apparatus and acetone as a solvent, a ratio of a weight of said component to a weight of a resin measured before said extraction is not less than 5%.

7. The electroconductive roller according to claim 1, wherein a polyurethane prepolymer and a latent curing agent are added to said thermosetting one-part polyurethane composition.

8. The electroconductive roller according to claim 1, wherein a polyurethane prepolymer prepared by a reaction between an excessive amount of an aliphatic polyisocyanate compound and a trifunctional polyether polyol is added to said thermosetting one-part polyurethane composition.

9. The electroconductive roller according to claim 1, wherein an anionic salt which is indicated by any one of chemical formulas 1, 2, and 3 ($X_1$, $X_2$, and $X_3$ are identical to or different from each other and show functional groups, having 1 to 8 carbon atoms, which contain carbon atoms, fluorine atoms, and sulfonyl group (—$SO_2$—)) shown below is added to said thermosetting one-part polyurethane composition of said electroconductive cellular material layer as an ionic-electroconductive agent:

Chemical formula 1

Chemical formula 2

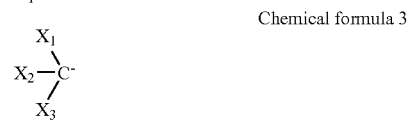

Chemical formula 3

10. The electroconductive roller according to claim 1, wherein a filler consisting of organic polymer particles is added to said thermosetting one-part polyurethane composition.

11. The electroconductive roller according to claim 1, wherein 0.5 to 30 wt % of organic polymer fine particles, having a diameter of 0.1 μm to 50 μm, which comprise of methyl methacrylate, styrene, acrylonitrile or a homopolymer of a monomer having vinyl double bond groups or a copolymer of said monomer are added to said thermosetting one-part polyurethane composition as a filler.

12. The electroconductive roller according to claim 1, wherein a salt compound of strong basic tertiary amine is added to said thermosetting one-part polyurethane composition as a catalyst.

* * * * *